US010960869B2

(12) United States Patent
Steer et al.

(10) Patent No.: US 10,960,869 B2
(45) Date of Patent: *Mar. 30, 2021

(54) METHOD AND APPARATUS FOR MONITORING OPERATION OF A VEHICLE BRAKING SYSTEM

(71) Applicant: Axscend Ltd., Runcorn (GB)

(72) Inventors: Timothy Steer, Folkestone (GB); Jolyon Latham, Knutsford (GB); Colin Ross, Kidderminster (GB)

(73) Assignee: Axscend Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/821,454

(22) Filed: Mar. 17, 2020

(65) Prior Publication Data

US 2020/0223419 A1 Jul. 16, 2020

Related U.S. Application Data

(63) Continuation of application No. 15/507,030, filed as application No. PCT/GB2015/052510 on Aug. 28, 2015, now Pat. No. 10,618,507.

(30) Foreign Application Priority Data

Aug. 29, 2014 (GB) .................................. 1415364
Jul. 16, 2015 (GB) .................................. 1512425

(51) Int. Cl.
*B60T 17/22* (2006.01)
*B60T 8/88* (2006.01)
(Continued)

(52) U.S. Cl.
CPC ............ *B60T 17/221* (2013.01); *B60T 8/885* (2013.01); *B64C 25/42* (2013.01); *G05B 23/0221* (2013.01)

(58) Field of Classification Search
USPC .......................................................... 73/132
See application file for complete search history.

(56) References Cited

U.S. PATENT DOCUMENTS 4,024,756 A * 5/1977 Cline ...................... G01L 5/282
73/132
5,171,069 A * 12/1992 Peck ...................... B60T 8/1708
303/118.1

(Continued)

FOREIGN PATENT DOCUMENTS

CA 2487704 A1 5/2006
CN 101722949 A 6/2010
(Continued)

OTHER PUBLICATIONS

British Combined Search and Examination Report dated Feb. 11, 2016 for British Application No. GB 1512425.8.
(Continued)

*Primary Examiner* — Clayton E. LaBalle
*Assistant Examiner* — Warren K Fenwick
(74) *Attorney, Agent, or Firm* — Endurance Law Group PLC

(57) ABSTRACT

A method for monitoring the braking performance of a vehicle. The method includes, for at least some of the braking events: determining a braking demand; determining vehicle deceleration; defining a first data set of braking events, wherein each braking event in the data set includes a determined braking demand and a determined vehicle deceleration; applying a statistical trend analysis method to the data set to generate a vehicle deceleration and braking demand trend; providing a vehicle deceleration and braking demand reference; and comparing at least one trend value with at least one reference value. From this comparison it is possible to determine if the braking system is operating (Continued)

within an acceptable limit. Apparatus for implementing the method is also disclosed.

37 Claims, 7 Drawing Sheets

(51) Int. Cl.
*B64C 25/42* (2006.01)
*G05B 23/02* (2006.01)

(56) References Cited

U.S. PATENT DOCUMENTS

| | | | | |
|---|---|---|---|---|
| 5,415,466 A * | 5/1995 | Breen | ................ | B60T 7/20 188/181 T |
| 5,467,645 A * | 11/1995 | Skorupski | ................ | G01L 5/28 73/121 |
| 5,719,565 A * | 2/1998 | Tsuno | ................ | B60G 17/0165 340/442 |
| 5,892,437 A * | 4/1999 | Scheibe | ................ | B60T 17/221 340/438 |
| 6,167,354 A * | 12/2000 | Maleki | ................ | B60T 8/1708 701/70 |
| 6,680,672 B2 * | 1/2004 | Borugian | ................ | B60T 17/221 340/449 |
| 6,754,562 B2 * | 6/2004 | Strege | ................ | G05B 23/0221 280/86.75 |
| 7,020,551 B2 * | 3/2006 | Goebels | ................ | B60R 16/0233 280/5.502 |
| 8,029,074 B2 * | 10/2011 | Cahill | ................ | B60T 8/1703 303/122.03 |
| 10,618,507 B2 * | 4/2020 | Steer | ................ | B60T 8/885 |
| 2002/0193910 A1 | 12/2002 | Strege et al. | | |
| 2005/0016787 A1 | 1/2005 | Lesesky et al. | | |
| 2006/0290199 A1 | 12/2006 | Beck et al. | | |
| 2010/0188203 A1 | 7/2010 | Wallace et al. | | |
| 2013/0145833 A1 | 6/2013 | Cahill | | |
| 2013/0282238 A1 | 10/2013 | Ricci et al. | | |
| 2016/0362118 A1 * | 12/2016 | Mollicone | ............ | G05D 1/0276 |

FOREIGN PATENT DOCUMENTS

| | | | | |
|---|---|---|---|---|
| CN | 102129623 A | | 7/2011 | |
| CN | 201917952 U | | 8/2011 | |
| CN | 202736136 U | | 2/2013 | |
| DE | 19647436 C2 | | 5/1997 | |
| DE | 102006031274 A1 | | 1/2008 | |
| DE | 102008040969 A1 | | 2/2010 | |
| EP | 1129888 A2 | | 1/2003 | |
| EP | 1650714 A1 | | 4/2006 | |
| EP | 1800982 A1 | | 6/2007 | |
| EP | 1832480 A1 | | 9/2007 | |
| EP | 1731396 B1 | | 12/2009 | |
| EP | 2468596 A2 | | 6/2012 | |
| EP | 2642149 A1 | | 9/2013 | |
| GB | 2377735 A | | 1/2003 | |
| GB | 2462864 | * | 2/2010 | ............ B60T 8/17 |
| GB | 2462864 A | | 2/2010 | |
| GB | 2499460 A | | 8/2013 | |
| GB | 2487704 B | | 10/2013 | |
| WO | 9906809 A1 | | 2/1999 | |

OTHER PUBLICATIONS

British Combined Search and Examination Report dated Feb. 27, 2015 for British Application No. GB 1415364.7.
British Search Report dated Mar. 3, 23016 for British Application No. GB 1515347.1.
International Preliminary Report on Patentability dated Feb. 28, 2017 for International application No. PCT/GB2015/052510.
International Search Report dated Jan. 7, 2016 for International application No. PCT/GB2015/052510.
Written Opinion dated Jan. 7, 2016 for International application No. PCT/GB2015/052510.

* cited by examiner

METHOD AND APPARATUS FOR MONITORING OPERATION OF A VEHICLE BRAKING SYSTEM

The present invention relates to a method and apparatus for monitoring the braking performance of a vehicle braking system. The invention can be used on any type of road vehicle having a braking system, however it is particularly suited to monitoring the performance of a braking system in heavy goods vehicles (HGV), or passenger carrying vehicles (PCV), or indeed a fleet of such vehicles. For example, a fleet or vehicle operator can use the invention to help determine if a vehicle's brakes are operating within normal parameters. The invention is applicable to trailers, traction units, rigid vehicles and other articulated vehicles.

Within Europe minimum "in service" braking requirements are defined by the European Commission but are very much dependent upon when the vehicle was first registered. Equally whilst minimum performance values are prescribed this does not prevent a Member State from applying higher values at national level. The latest EU Directive requires the "in service" performance of vehicles registered after a certain date to fulfil what is effectively the minimum Type Approval performance, older vehicles may still have reduced performance levels applied depending on National requirements. Unfortunately, the above Directive and other Directives associated with "in service" requirements do not specify a procedure which must be applied when determining braking performance, as a consequence there are many different procedures applied across the EU. Countries outside the EU may have their own minimum requirement for in-service braking performance and/or similar Type Approvals.

Vehicle owners and operators have to be able to demonstrate that the braking performance on their vehicles meet at least minimum performance levels. This typically requires the vehicle to be periodically tested on a Roller Brake Tester (RBT). A significant drawback with this is that the vehicle is out of use for the period of the test, the vehicle must be driven to a test station and perhaps more importantly there are only a limited number of RBT's and qualified persons to operate them available compared with a very large number of vehicles on the road. In the UK, legislation requires that vehicles are tested annually, however, regulatory (Traffic Commissioners) and/or standards enforcement (DVSA) ("agencies") can require a vehicles to be tested at any time or indeed the regulatory agency can apply a condition to a commercial vehicle operator's license that vehicles must be tested more frequently. The agencies produce guidelines to commercial vehicle operators outlining how often they recommend a vehicle should be tested, these tests are in addition to the annual legislated test. Since there is a possibility of regulators, or commercial vehicle operators taking it upon themselves to test vehicles frequently, it could lead to a situation where vehicles have to wait for a period of time before an RBT becomes available. This is highly undesirable.

In the UK the annual test does not require tri-axle trailers to be tested in a laden condition, it is envisaged that future legislation may require these vehicles to be tested when laden, which will increase the cost and time required to prepare the vehicle for the test. The current guidelines from government agencies recommend a commercial vehicle is presented in a laden condition. In addition the current UK test procedure does not require any control over the brake demand pressure (i.e. how much brake effort the driver requires), this is not desirable since Type Approval standards for commercial vehicles prescribe that brake performance is measured for a given braking demand, for example semi-trailers are required to be Type Approved controlled coupling head (demand) pressure. If a requirement to control the demand pressure was introduced into the RBT test procedure this would add further burden to the commercial vehicle operator and testing agency due to increased time required for the test.

Quite apart from the commercial burden of testing a vehicle laden and with controlled demand pressure, it is known that without these elements featuring as part of a RBT, the results of an RBT undertaken unladen are not indicative of the brake performance of a laden vehicle. Additionally without demand pressure control, i.e. without any control over the inputs of the RBT, the test results cannot be compared to the Type Approval standard as is required. Finally the current UK legislation allows a tri-axle semi-trailer to pass its annual RBT "on-locks" that is to say if at least half of the wheels are prevented from turning due to the brake effort then they will be considered to be approved and pass the test. This is a wholly unsatisfactory approval since, rather than being a brake test, it is simply a measure of the adhesion between wheel and RBT equipment. The problem is magnified due to the fact there is no legal requirement to present tri-axles trailers for test in a laden condition, i.e. wheels will be much more likely to lock during an RBT with an unladen trailer.

To mitigate this problem, it is known to place brake monitoring systems on vehicles, which collect performance data during normal vehicle use. One known system measures the average braking demand and the average deceleration achieved by the vehicle for each braking event. The system then places the results into one of sixteen categories and plots the results as a histogram in order to determine the number of braking events that fall into each category. A drawback with this system is that it simply counts the number of braking events in a particular category, which can obscure braking performance trends.

Another monitoring system provides an output which is indicative of the quality of the braking effect between a trailer and a tractor in order to determine if the tractor and trailer braking is well balanced. The results are categorised and are displayed as a histogram having separate data sets for the tractor and the trailer. A drawback with this system is that it simply counts the number of braking events in a particular category, which can obscure braking performance trends.

While the known systems can provide useful information about individual vehicles and how those vehicles have performed on average during the data collection period, they are less helpful for fleet management purposes because they do not enable the operator to determine when maintenance is likely to be required. If the operator is able to determine from the data when maintenance is likely to be required, he can schedule maintenance work to maximise utilisation of the vehicle. Also, since the known systems obscure trends, they do not clearly indicate when brake performance has deteriorated, nor do they provide any positive feedback which confirms that maintenance work on the brake has improved the performance. This is because the existing systems display rolling averages in their histograms.

A further problem that the inventors have identified is the need to arrange the data processing system in a manner that reliably determines the operating status of the braking system. The inventors have discovered that while braking event data is potentially available for all braking events, and for the entire time the brakes are applied for each braking event, not all of this data is of real value for braking monitoring purposes. The inventors have also discovered that if all available data is used it can have a negative impact on the results reported to fleet managers, for example indicating that a vehicle's brakes are in an out of tolerance condition, when this is not the case in reality. Such false out of tolerance reporting can prevent the vehicle from being used, thereby decreasing vehicle utilisation, and causing unnecessary maintenance work to be carried out. Accordingly there is a need for a system and method that utilises braking event data in a manner that provides consistent and reliable results, so that fleet managers can schedule brake maintenance work efficiently, and avoid results which falsely indicate an out of tolerance condition.

In some prior art systems, there can be significant variability in the recorded data, which can lead to inaccuracies when determining braking performance.

Accordingly the invention seeks to provide a method for monitoring the braking performance of a moving vehicle, and apparatus for implementing the method, which mitigates at least one of the above-mentioned problems, or at least provides an alternative method and apparatus.

According to one aspect of the invention there is provided a method for monitoring the braking performance of a vehicle, including, for at least some of the braking events: determining a braking demand; determining vehicle deceleration; defining a data set of braking events, wherein each braking event in the data set includes a determined braking demand and a determined vehicle deceleration; applying a statistical trend analysis method to the data set to generate a vehicle deceleration and braking demand trend; providing a vehicle deceleration and braking demand reference; and comparing at least one trend value with at least one reference value.

The reference typically defines an "in service" minimum requirement for the vehicle. The invention enables a fleet manager to determine from the data if the braking system is operating within acceptable limits by collecting data from the vehicle in normal operation.

This obviates the need to have an off road test conducted on an RBT, or at least reduce the frequency of off road RBT's. The advantage being that having regular reports on the performance status of the braking system reduces vehicle down time and therefore operating costs, the invention also overcomes many of the limitations of both the RBT itself and the lack of common procedure as described above. Furthermore, the use of a statistical trend analysis on braking event data collected while the vehicle is in normal operation enables the trend to predict braking performance, that is vehicle deceleration values, for braking demand values that rarely occur during normal operation. This is important since some "in service" testing regimes require vehicle brake performance to be tested at high braking demands, to demonstrate that the vehicle is capable of achieving at least a predetermined vehicle deceleration for at least one high demand value, for example to demonstrate how quickly the vehicle would stop when braking in emergency conditions. However braking events at high braking demand values, such as coupling head pressures of greater than 4 bar, are relatively rare during normal operation of some vehicles, and therefore without the predictive capability provided by the generated trend it may not be possible to demonstrate braking performance at high demand pressures with some testing regimes.

Advantageous optional features of the invention are disclosed in the dependent claims and the statements of invention below.

The brake monitoring system includes at least one microprocessor is located on-board the vehicle and is arranged to obtain sufficient data to determine a braking demand for the braking event and determine vehicle deceleration experienced for the braking event.

The method includes estimating a vehicle deceleration value for at least one braking demand value which is larger than the largest braking demand value in the data set. The vehicle deceleration and braking demand trend is used to provide the estimated vehicle deceleration value which is larger than the largest braking demand value in the data set.

The method includes estimating vehicle deceleration values for braking demands greater than or equal to 4 bar, preferably greater than or equal to 5 bar, and more preferably still greater than or equal to 6.5 bar. The vehicle deceleration and braking demand trend is used to provide an estimated vehicle deceleration value for a predetermined braking demand test value, such as at 6.5 bar, which can be compared with the reference deceleration value for 6.5 bar.

The method can include providing a confidence rating, for example in the form or a confidence value and/or error bar. This is an indication of the reliability of the braking event data to provide reliable estimated values. This enables a pass/fail determination to be made only if the confidence rating is within a predetermined acceptable range.

The method includes comparing at least one trend vehicle deceleration value with at least one reference vehicle deceleration value for a predetermined braking demand value, and determining if the braking system is operating satisfactorily, at least in part, on the basis of that comparison. Typically if the vehicle deceleration trend value for the predetermined braking demand value is greater than or equal to the reference deceleration value for the predetermined braking demand value, this is indicative that the braking system is operating satisfactorily. If the vehicle deceleration trend value for the predetermined braking demand value is less than the reference deceleration value for the predetermined braking demand value, this is indicative that the braking system is operating unsatisfactorily and requires attention. The predetermined braking demand value is greater than or equal to 4 bar, preferably greater than or equal to 5 bar, more preferably greater than or equal to 6 bar, and more preferably still around 6.5 bar.

The method includes comparing a plurality of values from the vehicle deceleration and braking demand trend with a plurality of values from the vehicle deceleration and braking demand reference to determine if the braking system is operating satisfactorily.

The method includes the statistical trend analysis generating a straight line trend. Any appropriate statistical technique for generating a straight line trend can be used, for example a linear regression technique such as least squares linear regression.

The method includes applying a weighted statistical trend analysis method, such as weighted least squares linear regression (WLS) technique, to the data set. The weighting method assigns greater importance to some braking events than others when generating the trend. The inventors have discovered that some types of braking events are more important than others for reliably determining if the braking system is operating in an out of tolerance condition. Unfortunately the most useful types of braking events occur less frequently during normal operating conditions. Using a weighted statistical trend analysis method compensates for this.

The statistical trend analysis method uses at least one of the following data types to weight braking events: vehicle load; braking demand; and change in vehicle speed. Preferably the weighting method assigns greater importance to braking events having larger vehicle load values. Preferably the weighting method assigns greater importance to braking events having larger braking demands values. Preferably the weighting method assigns greater importance to braking events having larger change in speed values.

Preferably a plurality of vehicle load; braking demand; and change in vehicle speed are used to weight the braking events. Preferably the weighting types are combined by calculating a geometric mean.

The reference preferably comprises a straight line. The reference provides a line of minimum braking performance, against which the trend derived from data collected from the vehicle in normal operation can be compared. The reference has a non-zero braking demand value at zero deceleration. In preferred embodiments, the non-zero braking demand value at zero deceleration represents a first end point for a reference line.

The reference has a braking demand value of greater than or equal to 0.1 bar, for zero deceleration, and preferably has a braking demand value of greater than or equal to 0.5 bar, and more preferably still has a braking demand value of approximately 1 bar for zero deceleration. The reference has a braking demand value of less than or equal to 2.0 bar for zero deceleration, and preferably has a braking demand value of less than or equal to 1.5 bar for a zero deceleration.

The reference has a deceleration value of greater than or equal to 0.4 g for a braking demand pressure of 6.5 bar, and is preferably greater than or equal to 0.42 g. In preferred embodiments, the deceleration value at 6.5 bar represents a second end point for the reference line.

The reference has a deceleration value of less than or equal to 0.55 g for a braking demand pressure of 6.5 bar, and is preferably less than or equal to 0.52 g. In preferred embodiments, the reference deceleration value is in the range 0.45 g to 0.5 g, inclusive, for a braking demand pressure of 6.5 bar. The specific value used is determined by the type of vehicle under observation. For some vehicles, the deceleration is preferably 0.45 g at a braking demand of 6.5 bar. For other vehicles, the deceleration is preferably 0.5 g at a braking demand of 6.5 bar. Preferably the reference is defined by the following formula for some vehicles:

pass vehicle deceleration=8.18*(braking pressure−1).

The method includes plotting a graph in a graphical user interface of vehicle deceleration vs braking demand, using the braking events data set. Typically braking demand is displayed on the x-axis and vehicle deceleration on the y-axis. Typically the braking demand is displayed as a demand pressure and the vehicle deceleration as a percentage (or decimal equivalent) of g. The method includes displaying the vehicle deceleration and braking demand trend on the graph. For example, displaying a trend line derived from the data set. The method includes displaying the vehicle deceleration and braking demand reference on the graph. For example, displaying a reference line based on the reference data and/or reference formula. The method can include comparing the trend line with the reference line. The method can include determining if the trend line crosses the reference line. Typically the reference line represents the minimum acceptable operating values.

Preferably the data set comprises a fixed number of braking events.

Preferably the data set comprises the n most recent braking events. Typically n is in the range 10 to 1000 and preferably in the range 30 to 250. The data set can comprise braking events from the N most recent journeys. The data set can comprise braking events between two time values, for example between two dates.

The method includes defining a new data set of braking events, wherein each braking event in the data set includes a determined braking demand and a determined vehicle deceleration; and applying the statistical trend analysis technique to the new data set to generate a new vehicle deceleration and braking demand trend.

The method includes comparing the new vehicle deceleration and braking demand trend with a previously generated vehicle deceleration and braking demand trend.

The method includes comparing at least one value from the new vehicle deceleration and braking demand trend with at least one value from the vehicle deceleration and braking demand reference to determine if the braking system is operating satisfactorily.

The new data set includes braking event data from a different time period from the previous braking event data set.

The method includes comparing a plurality of vehicle deceleration and braking demand trends for a vehicle, determining the rate of change in trend vehicle deceleration for a predetermined value of braking demand value, such as at 6.5 bar, and generating a vehicle maintenance event schedule, at least in part, on the basis of that comparison. From the rate of change of braking performance, an estimate can be made as to when the trend deceleration value is likely to equal the reference deceleration value. On that basis, a maintenance event can be generated, which is scheduled to take place on or before the estimated date that the trend value will equal the reference value. This enables a fleet operator to prevent the vehicle braking system from operating below the reference performance. This can include plotting a plurality of data trends on a vehicle deceleration vs braking demand graph. By comparing the braking performance for different time periods, that is different data sets of braking events, it is possible to determine changes in braking performance over time.

The method can include estimating the time at which the trend vehicle deceleration will equal the reference deceleration for the specified braking demand.

The method includes differentiating between qualifying braking events and non-qualifying braking events. Braking event data is filtered to remove braking events, according to predetermined criteria. Differentiating between qualifying braking events and non-qualifying braking events can take place at the data recording stage, for example only recording data for qualifying braking events, and/or at the data processing stage, where data recorded which relates to non-qualifying braking events are filtered out for data processing purposes. Only qualifying braking events are included in the data sets of braking events for data processing purposes.

The method includes determining a braking event is a non-qualifying event, at least in part, in response to determining that the delivery pressure is less than or equal to a threshold value.

The method includes determining a braking event is a non-qualifying event if a delivery pressure is exerted for a period of time which is less than or equal to a threshold value. A typical value for the delivery pressure is zero. That is, any positive delivery pressure detected is greater than the threshold value. The threshold time value is typically around 1 second. The purpose of this filter is to take account of system response times in the braking system after the brake pedal is actuated by the driver, before starting braking event data collection.

The method includes determining a braking event is non-qualifying, at least in part, in response to determining that the vehicle speed is less than or equal to a threshold value. A typical threshold value for vehicle speed is around 4 m/s.

The method includes determining a braking event is non-qualifying, at least in part, in response to determining that the braking demand is less than or equal to a threshold value. A typical threshold value for braking demand is around 1 to 2 bar, and preferably around 1.5 bar.

The method includes determining a braking event is non-qualifying, at least in part, in response to determining that an output from an endurance brake device is greater than or equal to a threshold value.

The method includes a brake monitoring system, in response to a driver actuating the vehicle braking system, applying at least one braking event qualifying test to data received from the braking system.

For monitoring purposes, a braking event has a defined start. The method includes the brake monitoring system setting initial values for at least some variables in response to the brake monitoring system determining that the braking data has passed the or each braking event qualifying test. Thus at least one qualifying test is applied prior to the defined start of a braking event. The defined start of the braking event commencing after the or each initial qualifying test is passed.

For monitoring purposes, a braking event has a defined end, which is determined according to the occurrence at least one predetermined criterion.

At the end of a braking event the brake monitoring system determines the braking event duration, vehicle deceleration and average braking demand.

The braking event duration, vehicle deceleration and braking demand are preferably determined, in response to at least one, and preferably each, of the following conditions occurring: the current demand pressure is smaller than the set minimum demand pressure; the current demand pressure is smaller than the difference between the high-water mark demand pressure and a set minimum demand pressure drop; and the current vehicle speed is less than the set minimum vehicle speed. This defines the end of the data monitoring phase for the braking event.

The brake monitoring system applies at least one braking event qualifying test to at least some of the determined data, such as the braking event duration, vehicle deceleration and braking demand, and stores the braking event data collected for the braking event only if the determined data passes the or each qualifying test.

The method includes determining a braking event is non-qualifying, at least in part, in response to determining that the duration of the braking event is less than or equal to a threshold value. A typical threshold value for the braking event is around 1 second.

The method includes determining a braking event is non-qualifying, at least in part, in response to determining that the average braking demand for a braking event is less than or equal to a threshold value. A typical threshold value is around 1 bar.

The method includes determining vehicle and/or axle load from data received from a sensor located on the vehicle. For example, the vehicle load can be determined from readings from a suspension system sensor, such as air pressure in air springs in an air suspension system.

The method includes categorising the braking events into a plurality of categories according to the determined vehicle load. The data set can be filtered such that the braking events in the data set includes braking events from one vehicle load category only.

The method includes, for at least some of the braking events, determining the time the braking event occurred. This enables the operator to monitor changes in braking performance over time, and assists in scheduling braking maintenance. The time the braking event occurred is taken from a clock, which preferably provides at least one of a date and time within a given day. In some embodiments, a clock accurate to around 1 ms is provided.

The method includes, for at least some of the braking events, determining the extent to which gravity affects the determined vehicle deceleration. For example, the method can include, for at least some of the braking events, determining the road gradient. The road gradient is determined from signals received from at least one of a gyroscope; an accelerometer; and an altimeter. In preferred embodiments, both the gyroscope and accelerometer are used to provide the road gradient. In some embodiments, the altimeter together with other data gathered during a braking event, such as distance travelled during the braking event, provides the road gradient.

The method includes for at least some of the braking events, determining the position of the vehicle. The position can include at least one of: an average position for the braking event; the position at the start of the braking event; the position at the end of the braking event; and some other position related to the braking event. The position data can be obtained from a dedicated positioning system, such as: a Global Navigation Satellite System (GNSS), for example GPS or GLONASS; from a terrestrial radio network, for example cellular communication networks, e.g. a GSM cell; and/or other beacon (radio or otherwise) type technologies such as Wi-Fi hotspots.

The method includes using at least one of the position data and time data to identify relevant environmental conditions data for an environmental conditions correction process.

The method includes, for at least some of the braking events, determining at least one unique identifier for the vehicle, and associating the or each unique vehicle identifier with the braking event data. This is particularly useful for fleet management purposes when there are a large number of vehicles to be monitored.

In some embodiments the vehicle includes a tractor unit and at least one trailer. The method includes determining at least one of: a tractor unit identifier that uniquely identifies the tractor unit; and a trailer identifier that uniquely identifies the trailer. For embodiments including a plurality of trailers, a plurality of unique trailer identifiers are provided.

The method includes, for at least some of the braking events, correcting the determined deceleration.

The determined deceleration can be corrected by at least one of: an environmental conditions correction; road gradient correction; tractor unit correction; a rate of turn correction; and an endurance brake correction.

Applying the tractor unit correction to the determined deceleration, includes at least one of the following: multiplying the determined deceleration by a tractor unit correction factor; adding a tractor unit correction to the determined deceleration; and subtracting a tractor unit correction from the determined deceleration.

Advantageously the tractor unit correction of the determined deceleration, accounts for the characteristics of the tractor unit pulling the trailer. The corrected determined deceleration data is recorded. As well as enabling the calculation of corrections, uniquely identifying the vehicle, tractor unit and/or trailer assists the operator to identify trends across a fleet of vehicles, for example a type or combination of vehicle/tractor unit/trailer that requires attention more frequently than other types or combination of vehicle/tractor unit/trailer, and to identify specific vehicles/tractor units/trailers which need attention. If no tractor unit identifier is available, a nominal tractor unit correction can be applied to the determined deceleration data, for example an average tractor unit correction.

The environmental conditions correction accounts for the environmental conditions where the braking event took place. It takes into account at least one relevant environmental conditions parameter. The corrected determined deceleration is recorded. For example, the environmental conditions can include road conditions, such as road surface, gradient, etc., and/or weather conditions such as the amount of recent rainfall, temperature, etc. If insufficient environmental conditions data is available for the braking event, or a set of braking events, the determined deceleration value is not adjusted.

The endurance brake correction adjusts the determined deceleration to take into account the braking effect of the or each endurance brake used during the braking event.

The method includes for at least some braking events, storing at least some of the following: data required to determine the braking demand; the determined braking demand; data required to determine vehicle deceleration; the determined vehicle deceleration; the time the braking event occurred; at least one vehicle identifier, preferably a tractor unit identifier and a trailer unit identifier; the road gradient; the position of the vehicle; and vehicle lateral deceleration for rate of turn correction.

At least one of the braking demand, the vehicle deceleration and brake duration can be determined on-board the vehicle, for example using the microprocessor located on-board the vehicle. Additionally, or alternatively, at least one of the braking demand, the vehicle deceleration and the braking performance value can be determined at a remote data processing unit. For embodiments where the braking demand and vehicle deceleration are determined at the remote data processing unit, the monitoring system located on the vehicle is typically arranged to obtain the raw data, and/or any intermediate data, required to determine the braking demand and/or vehicle deceleration, and to store and/or transmit that data for processing remote from the vehicle.

According to another aspect of the invention there is provided a data processing system arranged to carry out a method as described herein, said data processing system including at least one data processing device, at least one data storage means, and data correlation and trend analysis module arranged to determine trends from the braking event data.

The data processing system includes at least one of: a data aggregation and storage module; a data connection; a consolidated data store; analysed data store; data server module; report module; and user interface, which preferably includes a graphical user interface, to gain access to the reports generated by the report module.

Preferably the or each module is provided as part of a vehicle fleet management system.

According to another aspect of the invention there is provided apparatus including a vehicle having a braking system and a brake monitoring system, wherein the brake monitoring system is arranged to obtain, for at least some braking events: data for determining a braking demand; and data for determining vehicle deceleration.

Advantageous optional features of the invention are disclosed in the dependent claims and the statements of invention below.

The brake monitoring system is connected to the braking system via a CAN bus. The brake monitoring system is arranged to receive data from the braking system via the CAN bus.

The brake monitoring system includes at least one microprocessor. The or each microprocessor is arranged to obtain braking event data from the braking system.

Advantageously, in response to a driver actuating the vehicle braking system, the brake monitoring system is arranged to apply at least one braking event qualifying test to data received from the braking system. This enables the brake monitoring system to differentiate between qualifying braking events and non-qualifying braking events. Thus the data is filtered to remove, and/or not record at all, certain types of braking events, according to predetermined criteria.

Advantageously the brake monitoring system is arranged to compare a current delivery pressure value with a delivery pressure threshold value, and determine if the braking event is a non-qualifying braking event, at least in part, on the basis of that comparison.

The brake monitoring system is arranged to determine the period of time for which a delivery pressure is exerted, and determine if the braking event is a non-qualifying braking event, at least in part, if the time is less than or equal to a threshold value.

The brake monitoring system is arranged to compare a current vehicle speed value with a predetermined threshold vehicle speed value, and determine if the braking event is a non-qualifying braking event, at least in part, on the basis of that comparison.

The brake monitoring system is arranged to compare a current braking demand value with a predetermined threshold braking demand value, and determine if the braking event is a non-qualifying braking event, at least in part, on the basis of that comparison.

The vehicle can include at least one endurance brake device, wherein the brake monitoring system is arranged to obtain, for at least some braking events: data from the endurance brake device.

The brake monitoring system is arranged to compare output data from at least one endurance brake device with a predetermined threshold value for the at least one endurance brake device and determine if the braking event is a non-qualifying braking event, at least in part, on the basis of that comparison.

The brake monitoring system is arranged to set initial values for at least some variables in response to the brake monitoring system determining that the braking data has passed the or each braking event qualifying test.

The brake monitoring system is arranged to determine for a braking event: the braking event duration.

The brake monitoring system is arranged to determine the braking event duration, vehicle deceleration and braking demand in response to at least one, and preferably each, of the following conditions occurring: the current demand pressure is smaller than the set minimum demand pressure; the current demand pressure is smaller than the difference between the high-water mark demand pressure and a set minimum demand pressure drop; and the current vehicle speed is less than the set minimum vehicle speed. This defines the end of the data collection phase for the braking event.

The brake monitoring system is arranged to apply at least one braking event qualifying test to at least some of the determined data, and to store the braking event data collected for the braking event only if determined data passes at least one, and preferably each, qualifying test.

The brake monitoring system is arranged to compare the duration of the braking event with a duration threshold value.

The brake monitoring system is arranged to compare the braking demand value with a threshold braking demand value.

The apparatus includes data storage means located on the vehicle, wherein the microprocessor is arranged to store at least some braking event data in the data storage means. Preferably the monitoring system is arranged to store braking event data for qualifying braking events only.

The microprocessor is arranged to obtain, for at least some braking events: time data for the braking event. The brake monitoring system includes a clock arranged to provide time data for a braking event. The clock can be integrated within the microprocessor package.

The brake monitoring system includes at least one unique vehicle identifier for the vehicle. The microprocessor includes and/or is arranged to obtain at least one unique vehicle identifier for the vehicle.

In some embodiments the vehicle includes a tractor unit and a trailer. The brake monitoring system, includes a unique identifier which uniquely identifies the tractor unit. The microprocessor includes and/or is arranged to obtain a unique identifier which uniquely identifies the tractor unit. The brake monitoring system includes a unique identifier which uniquely identifies the trailer. The microprocessor includes and/or is arranged to obtain a unique identifier which uniquely identifies the trailer.

The or each unique identifier is preferably in the form of a unique identification code. The or each code may be stored, for example in a device such as a microprocessor; modem; memory; data tag, such as an RFID tag; or any other suitable device. The identifier code can comprise a unique serial number for the device, which is accessible to the microprocessor.

The microprocessor is arranged to obtain, for at least some braking events: road gradient data. The apparatus includes at least one accelerometer and/or at least one gyroscope and/or at least altimeter. At least one microprocessor is arranged to obtain data from at least one of the accelerometer, gyroscope and altimeter for a braking event. Preferably the accelerometer comprises a 3D accelerometer.

The apparatus includes a positioning system, wherein at least one microprocessor is arranged to obtain vehicle position data from the positioning system for a braking event.

The apparatus includes a wireless telecommunications device arranged to send data from the brake monitoring system to a remote data processing system.

The apparatus includes at least one data port to enable data to be downloaded to a computer device. The at least one data port can include at least one wired data port and/or at least one wireless data port.

The apparatus includes a data connection between the at least one microprocessor and a CAN bus, wherein the or each microprocessor is arranged to retrieve vehicle sensor data from the CAN bus.

The apparatus includes a data processing system having at least one data processing device and at least one data storage means. The data processing system is typically remote from the vehicle, however it can be provided on the vehicle.

At least one of the vehicle microprocessors and the remote data processing device is arranged to determine, or obtain, at least one of the following data types for at least some braking events: determined deceleration for the braking event; data for determining deceleration for the braking event; determined braking demand for the braking event; data required for determining the braking demand; an identifier that uniquely identifies the entire vehicle; an identifier that uniquely identifies a tractor unit; an identifier that uniquely identifies a trailer; position of the vehicle; deviation of the determined deceleration for the braking event from a reference deceleration value; and an determined deceleration corrected for at least one of environmental conditions, tractor unit and rate of turn.

At least one vehicle microprocessor is arranged to obtain at least one of the following data types: brake temperature; tyre pressure; wheel speed; vehicle speed; suspension pressure; brake reservoir pressure; brake delivery pressure; odometer data; lateral acceleration; load plate data (for example at least one of the maximum and minimum pressures within the air suspension for a laden and unladen vehicle); and brake calculation data (which is the designed braking performance).

According to another aspect of the invention there is provided a method for monitoring the braking performance of a vehicle, including, for at least some of the braking events: determining a braking demand; determining vehicle deceleration; and further including at least one of the following: determining the time the braking event occurred; determining the road gradient; and determining at least one unique vehicle identifier.

According to another aspect of the invention there is provided a method for monitoring the braking performance of a vehicle, including, for at least some braking events, recording: the time of the braking event; a braking demand, and/or at least sufficient data to determine the braking demand; vehicle deceleration, and/or at least sufficient data to determine the vehicle deceleration; and at least one unique identifier for the vehicle.

A method for monitoring the braking performance of a vehicle, including, for at least some of the braking events: determining a braking demand and determining vehicle deceleration; providing a vehicle deceleration and braking demand reference; and comparing at least one determined value from the vehicle with at least one reference value.

Embodiments of the invention will now be described by way of example only, with reference to the accompanying drawings, wherein.

Figure 1:
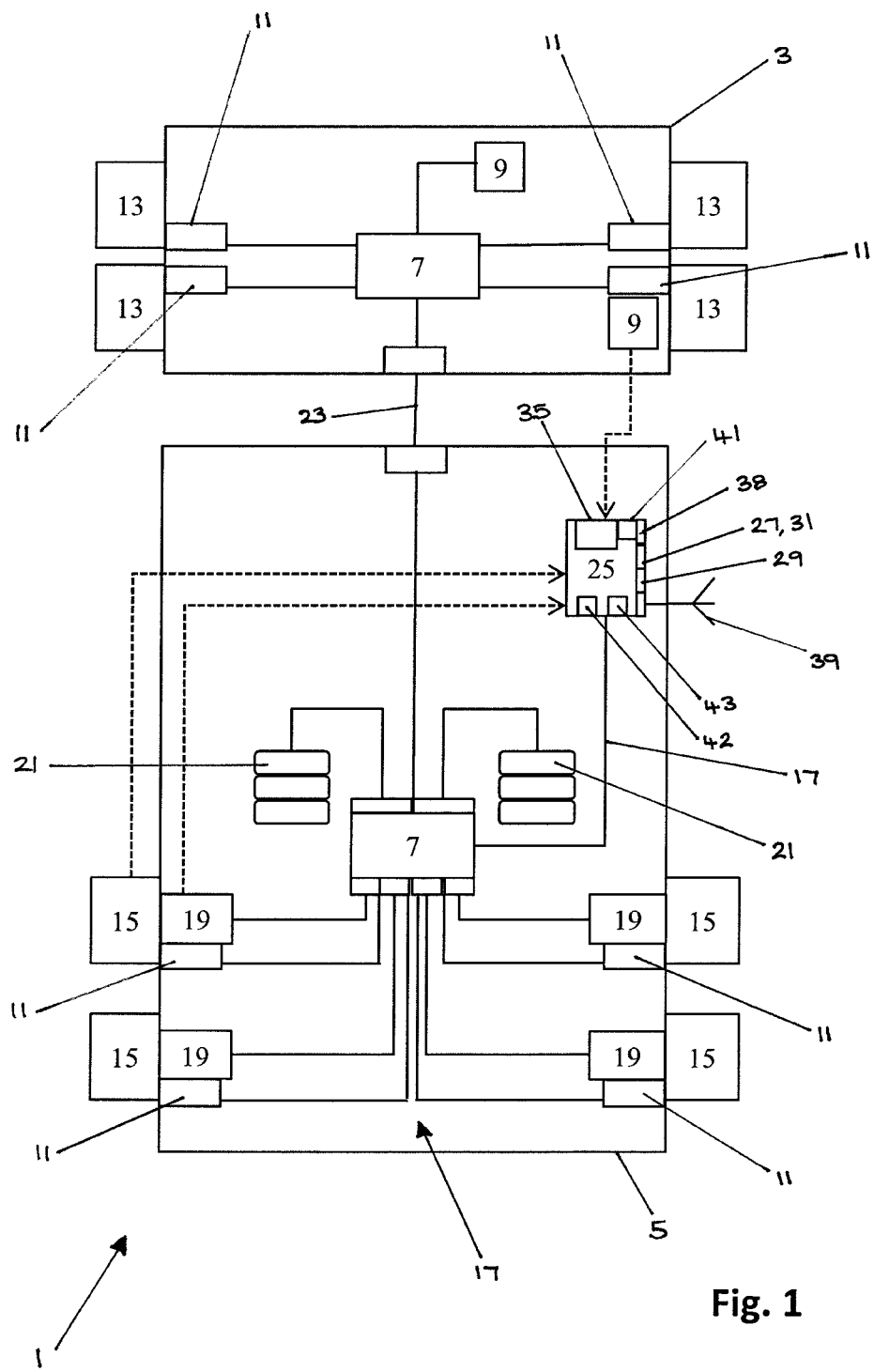
FIG. 1 is a schematic view of an embodiment of the invention.
Figure 2:
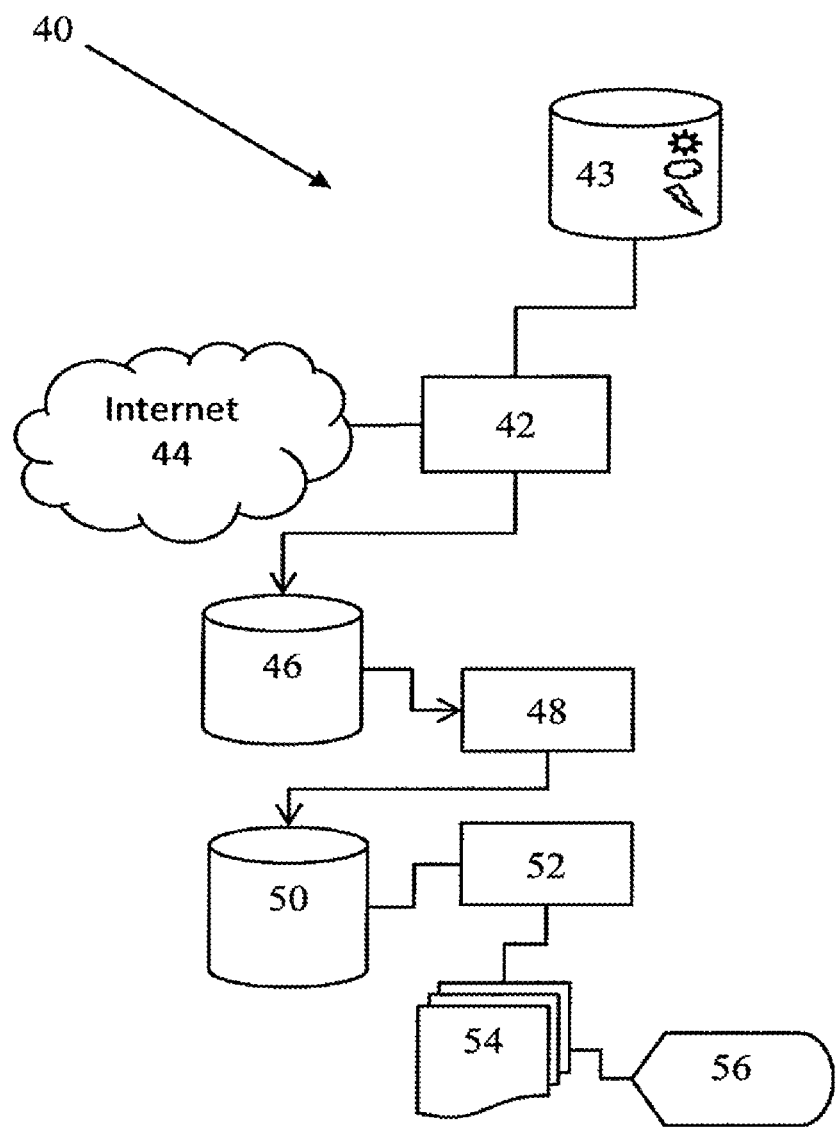
FIG. 2 is a schematic view of a remote data processing system and the data processing steps used in the invention.

FIGS. 1 and 2 show apparatus according to the invention, which includes a heavy goods vehicle 1 and data processing system 40.

Vehicle

The vehicle 1 includes a tractor unit 3, a trailer 5 and a braking system 7. Typically the tractor unit 3 is coupled to the trailer via at least two of the following: a 7 pin ABS/EBS cable (ISO7638), a 7 pin cable (ISO1185 aka 24N), a 7 pin cable (ISO3731 aka 24S), a 15 pin cable (ISO12098).

The braking system 7 is operated by a driver depressing a brake pedal 9. The braking system 7 generates a control signal which is indicative of the braking demand applied by the driver. The braking demand is indicative of how hard the driver actuates the brake pedal 9, and therefore how quickly the driver wants to stop the vehicle. The control signal is used by the braking system 7 to operate brake actuators 11 in order to brake wheels 13,15.

A common type of braking system is an Electronic Braking System (EBS). EBS systems are typically electronic and operate on a brake by wire arrangement, reverting to hydraulic or pneumatic operation in the event of a fault. Other types of braking systems are hydraulically or pneumatically actuated. The invention is applicable to each of these types of braking system. For EBS systems, references in the description to pressure, for example demand pressure, should be interpreted as the equivalent electrical signal.

Signals are communicated between the tractor unit 3 and trailer 5 via a data connection 23, which may be included in one of the cables referred to above.

The apparatus includes a brake monitoring system 25, which is used to monitor the performance of the braking system 7. The brake monitoring system 25 is arranged to determine if the braking system 7 is operating in a satisfactory manner, or is used to at least record the appropriate data required to determine if the braking system 7 is operating in a satisfactory manner. The brake monitoring system 25 obtains braking event data for at least some braking events.

The brake monitoring system 25 includes at least one microprocessor device 27, non-volatile memory 29, and a clock 31, which preferably provides time and date data, such as a real-time clock. The microprocessor 27, memory 29 and clock 31 are preferably located on the trailer 5. The clock 31 is typically an internal clock in the microprocessor 27.

A trailer data code is provided, which uniquely identifies the trailer 5. The trailer data code is preferably a code associated with of one of the electronic components in the brake monitoring system 25, which is located on the trailer 5, and which is accessible to the microprocessor 27 either directly from that component, or can be recorded in the memory and is accessible from the memory 29. For example, the trailer data code can be the unique IMEI number for a modem, a telephone number, SIM number, component serial number, or a code programmed into the microprocessor 27.

Preferably a tractor unit data code is provided, which uniquely identifies the tractor unit 3. The tractor unit data code can be recorded in a data tag 33, which is attached to the tractor unit 3, and the brake monitoring system 25 preferably includes an data tag reader 35 located on the trailer 5. The microprocessor 27 is arranged to receive signals from the data tag reader 35, which enables the microprocessor 27 to identify the specific tractor unit 3 which is pulling the trailer 5 for each braking event. The tractor unit data code can be transmitted from the tag 33 periodically. The data tag 33 can be a radio data tag such as an RFID tag.

Additionally, or alternatively, the tractor unit data code can be recorded in an electronic device located on the tractor unit 3, and the tractor unit data code can be provided to the microprocessor 27 over a wired connection, such as data link 23, for example each time the brake pedal is operated. The tractor unit data code can be a unique number for a modem, component serial number, the tractor unit's vehicle identification number (VIN) or a code programmed into a tractor unit microprocessor.

The tractor unit and trailer unit data codes are recorded for data processing purposes so that braking event data sets are correctly associated with the appropriate tractor unit and trailer.

The brake monitoring system 25 is connected to the braking system 7 via the CAN bus 17. This enables the brake monitoring system 25 to monitor signals available to the braking system 7, which may include, for example, outputs from sensors that monitor: wheel speed; vehicle speed; braking demand (pneumatic, hydraulic, and/or electrically signalled); suspension pressure; reservoir pressure; delivery pressure (pneumatic, hydraulic, and/or electrically signalled); tyre pressure; odometer; and lateral acceleration. Other data includes DTCs (Diagnostic Trouble Codes) and braking system status data.

The brake monitoring system 25 can include, or can be arranged to receive signals from, at least one sensor which is sensitive to changes in acceleration. For example, the braking monitoring system 25 can include, or can be arranged to receive signals from, at least one accelerometer 42, such as a 3D accelerometer. Additionally, or alternatively, the braking monitoring system 25 can include, or can be arranged to receive signals from, at least one gyroscope 43. The microprocessor 27 is arranged to receive data from the accelerometer 42 and/or gyroscope 43 for a braking event.

The gyroscope 43 provides an indication of the rate of change of angle of inclination of the vehicle with respect to a horizontal plane, and hence the rate of change of inclination of the road with respect to the horizontal plane, for the braking event. Using input signals from the gyroscope 43 and the accelerometer 42 it is possible to determine the angle of inclination of the vehicle, and hence road, for a braking event. This data can be used to determine the effect to which gravity has influenced the determined vehicle deceleration for the braking event, using basic geometry.

Typically, the brake monitoring system 25 includes at least one of: a wireless telecommunications device 39, for example which may include a cellular telephonic device; and a local data port 41.

The microprocessor 27 is preferably programmed to send braking event data to the data processing system 40, which is located remotely from the vehicle, using the telecommunications device 39. The microprocessor 27 can be programmed to do this as soon as the data is received, at predetermined intervals in order to conserve power and data costs, or other trigger events such as a log level reaching a threshold value or power status change. When the data is received at the remote data processing system 40, the operator can analyse the data to determine the braking performance of the braking system 7. This can be done manually and/or automatically. For embodiments including a cellular telecommunications device, the brake monitoring system 25 can determine from the telecommunications device an approximate vehicle position based on cell location information. For many applications, this approximate position would be sufficient to obtain environmental data for an environmental correction.

The local data port 41, which may be, for example a wired connection and/or a local wireless connection, such as an infrared, Bluetooth® and/or Wi-Fi connection, enables a computer device to download braking performance data from the vehicle. The computer device may be, for example a portable device such as a laptop or tablet device, which enables a fleet operator to download data from the brake monitoring system 25. For embodiments having a wireless data port 41, data can be downloaded as the vehicle drives past, or parks next to, a receiver at a fleet operators facility.

Data Processing System

While all of the data processing steps described below to assess the operating status of the braking system 7 can take place on the vehicle, it is preferred to undertake at least some and preferably most of the data processing steps at the remote data processing system 40.

FIG. 2 illustrates the architecture of the data processing system 40. The data processing system 40 includes a data aggregation and storage module 42; a data connection 44; a consolidated data store 46; data correlation and trend analysis module 48; analysed data store 50; data server module 52; report module 54; and user interface 56, which preferably includes a graphical user interface, to gain access to the reports generated by the report module 54. Preferably the data processing modules form part of a fleet management software package.

The data processing system 40 may be located at a data processing centre, for example the data processing system 40 may be hosted on a server, or a computer linked to a server. Alternatively the data processing system 40 may comprise a portable computer, or may be integrated into the brake monitoring system 25.

The data aggregation and storage module 42 is arranged to receive data from the vehicle via the data connection 44, and record the data received in the consolidated data store 46. The data aggregation and storage module 42 can be arranged to communicate with at least one database 43 to obtain data for correcting at least one parameter. For example, the module 42 can be arranged to access at least one database 43 which stores environmental data, such as road conditions and/or weather data, for use in an environmental data correction process. Typically, the module 42 determines whether it is necessary to adjust the deceleration data received from the vehicle for environmental conditions, and if so, applies the correction.

The database(s) 43 accessed by the module 42 can be held by the operator or may be held by a third party.

The data correlation and trend analysis module 48 makes any further necessary adjustments to the data. For example, the data correlation and trend analysis module 48 can be arranged to apply a correction process to at least one of the parameters to account for the tractor unit. The module 48 can be arranged to apply a tractor unit correction process to the original vehicle deceleration data retrieved from the vehicle, or to the vehicle deceleration data as modified for environmental conditions or other corrections. The data correlation and trend analysis module 48 can be arranged to apply a correction process to at least one of the parameters to account for road gradient. The module 48 can be arranged to apply a road gradient correction process to the original vehicle deceleration data retrieved from the vehicle, or to the vehicle deceleration data as modified for environmental conditions, tractor unit and/or other corrections.

The data correlation and trend analysis module 48 also processes the braking event data, in its original form or as corrected, to generate a trend, such as a line of best fit, from the data. The module 48 compares trend data with reference data to determine if the braking system 7 is operating satisfactorily.

The data analysed by the data correlation and trend analysis module 48 is recorded in data store 50.

The results of the analysis can be provided via the data server module 52; report module 54; and user interface 56.

In operation, braking event data for at least some braking events is recorded by the brake monitoring system 25.

Braking Event Data Collection

Figure 3:
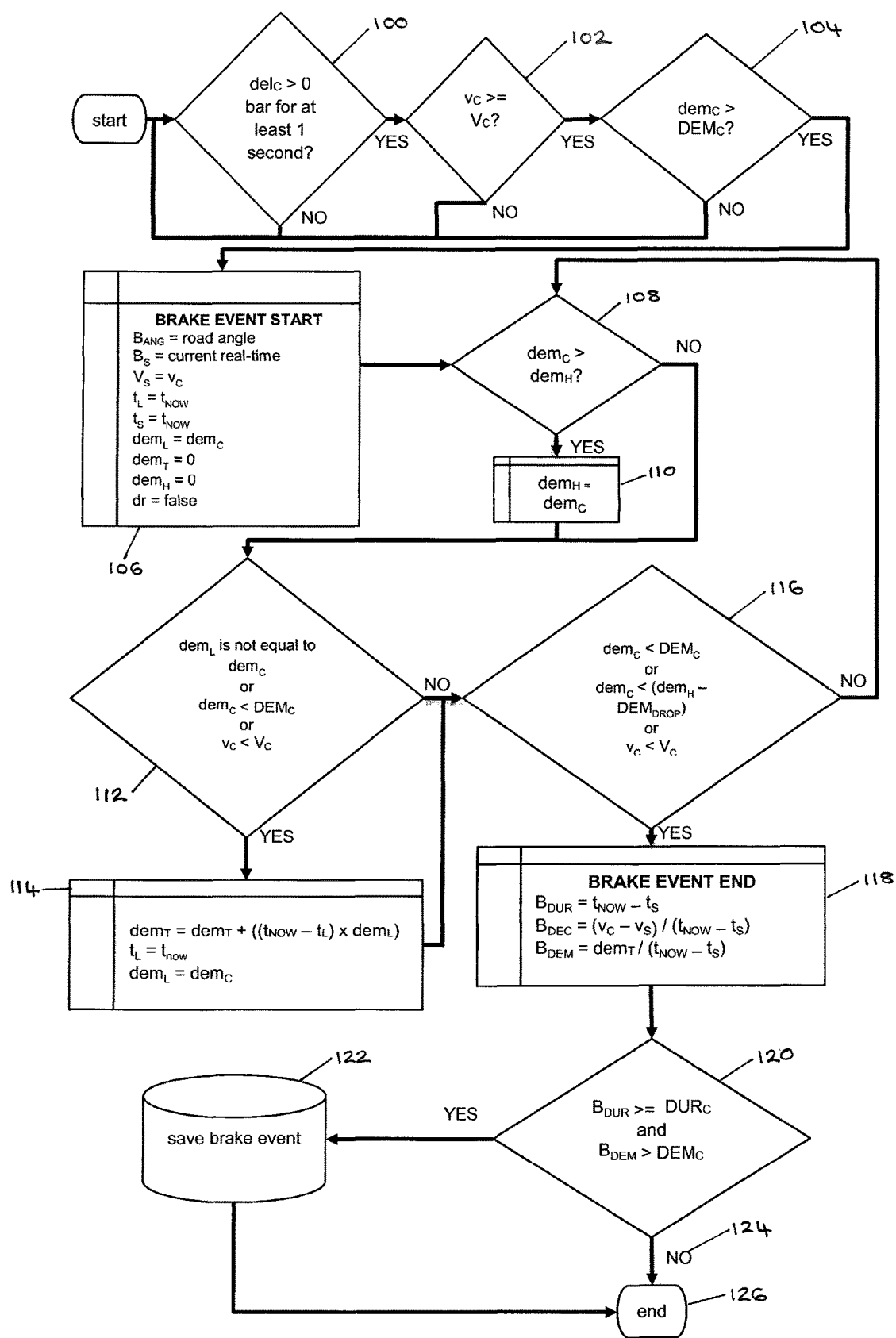
FIG. 3 is a flow diagram which illustrates a method for obtaining braking event data.

Braking event data is collected during normal use of the vehicle, for example while driving on public roads. A preferred method for collecting braking event data is shown in FIG. 3. A key for the symbols used in FIG. 3 is set out below.

Key for FIG. 3

$B_{DEC}$—average deceleration for braking event
$B_{DEM}$—average demand pressure for braking event
$B_{DUR}$—duration for braking event
$B_S$—timestamp of start for braking event
$del_C$—current delivery pressure (This is indicative of load applied to brakes, in response to braking demand)
$dem_C$—current demand pressure (This is indicative of how hard the driver is pressing the brake pedal. For vehicles comprising a tractor unit and trailer, this is sometimes referred to as the coupling head pressure since the braking demand is typically obtained from a transducer located where the trailer couples to the tractor unit)
$dem_L$—last demand pressure
$dem_H$—high-watermark demand pressure
$dem_T$—total demand pressure
$DEM_C$—configurable minimum demand pressure (preferably set at 1 bar)
$DEM_{DROP}$—configurable minimum demand pressure drop (preferably set at 300 mbar)
$DUR_C$—configuration minimum duration for braking event (preferably set at 1 second)
$t_S$—measurement timestamp at start for braking event
$t_C$—current measurement timestamp
$t_L$—last measurement timestamp
$t_{NOW}$—current high-resolution timer value
$v_C$—current vehicle speed
$V_C$—configurable minimum vehicle speed (preferably set at 4 m/s)
$v_S$—vehicle speed at start for braking event
$B_{ANG}$—road angle, which is determined from output of gyroscope; accelerometer; and/or altimeter. The road angle value can be taken as a single reading, for example at the start of a braking event, or multiple readings can be taken during an event, and an average road angle calculated for the braking event.

Braking Actuation Filters

The braking system 7 is actuated by the driver by operating the brake pedal. Braking system 7 data is available to the brake monitoring system 25 for all brake applications over the entire time the brakes are applied. However not all available braking data is of value for determining if the braking system 7 is operating satisfactorily. The inventors have discovered that some braking data can have a negative impact on the results. As a consequence, it is desirable to apply at least one data filter on the vehicle to obtain useful data only. This is to prevent permanent recordal of: 1) data relating to some entire braking actuations and/or 2) data relating to part of some braking events. This ensures that the data recorded is useful data.

The brake monitoring system 25 applies three data filters each time the driver actuates the braking system 7: a brake delivery time filter 100; a vehicle speed filter 102; and a brake demand filter 104. These data filters distinguish between qualifying braking events, which are considered to be useful for data processing purposes, and non-qualifying braking events which are considered not to be useful for data processing purposes. In some applications a road gradient filter can be applied to filter out some braking events.

The brake delivery time filter 100 prevents recordal of braking events wherein a braking delivery pressure exists for a period of time which is smaller than a set value, for example 1 second. The brake monitoring system 25 determines if the current delivery pressure ($del_C$) is greater than a predetermined delivery pressure value, such as greater than 0 bar, for the set period of time. For any braking actuation where the current delivery pressure is greater than the set value, for a period of time which is greater than or equal to the set time value, passes the test. For any braking actuation where the current delivery pressure is greater than the set value, for a period of time which is less than or equal the set time value, the braking event is determined as non-qualifying, and therefore the braking event is determined as not having started. The time set value is typically in the range 0.1 seconds to 1.5 seconds.

The brake delivery time filter 100 is applied since a brake unit actuator is typically the last part of the braking system 7 which applies a force to the brake, and although a brake demand may be within a desired range, it takes time from the initial actuation of the braking system 7 by the driver for the brake force to stabilise, therefore a time filter has the benefit of eliminating the initial part of the brake application.

The vehicle speed filter 102 prevents braking data from being obtained when the vehicle is travelling below a predetermined value, such as 4 m/s. In response to the driver actuating the braking system 7, the vehicle speed filter 102 determines if the current vehicle speed ($v_C$) value is greater than or equal to a set vehicle speed value ($V_C$). For any braking actuation where the current speed is greater than or equal to the set value, passes the test. For any braking actuation where the current vehicle speed is less than the set vehicle speed value, the braking event is determined as non-qualifying, and therefore the braking event is determined as not having started. Typically, this prevents low speed braking events from qualifying.

The braking demand filter 104 prevents braking data from being obtained when the braking demand is below a predetermined value, such as around 1.5 bar. In response to the driver actuating the braking system 7, the braking demand filter 104 determines if the current braking demand value ($dem_C$) is greater than a set braking demand value ($DEM_C$). Any braking actuation where the current braking demand is greater than the set braking demand value, passes the test. For any braking actuation where the current braking demand is less than or equal to the set braking demand value, the braking event is determined as non-qualifying, and therefore the braking event is determined as not having started. Typically, this prevents low demand pressure events from qualifying.

The brake demand for a vehicle having a trailer and tractor unit is typically obtained from a signal generated by a sensor, which may be pneumatic or electrical. Typically a braking force is not generated until a coupling head signal of around 0.8 bar is generated. The braking event data at low braking forces is not very useful for determining if the braking system 7 is operating satisfactorily and therefore it is preferable not to use brake actuation data wherein the brake demand is below around 1.0 bar, preferably below 1.2 bar and more preferably still below around 1.5 bar Braking Events For braking actuations which are not filtered out by at least one of the above-mentioned filters 100,102,104, the brake monitoring system 25 starts braking event data collection. At the start of a braking event 106, the brake monitoring system sets the following parameter values:

The timestamp at the start of the braking event ($B_S$)=current real-time

The vehicle speed at the start of the braking event ($v_S$)=$v_C$

The last timestamp measurement ($t_L$)=$t_{NOW}$

The timestamp measurement at the start of the braking event ($t_S$)=$t_{NOW}$

The last demand pressure ($dem_L$)=$dem_C$

The total demand pressure ($dem_T$)=0

The high-watermark demand pressure, which is the highest demand pressure recorded during the braking event ($dem_H$)=0

Boolean logic indicating if demand pressure rose (dr)=false

Optional additional data that can be recorded during a baking event, includes:

$B_{ANG}$=road angle, which is determined from output of gyroscope and/or accelerometer and/or altimeter Air spring pressure to axle/bogie load relationship—for determining the load carried by the vehicle; and Vehicle position—from GPS Typically the air spring pressure reading for an air spring 21 is the most recently available reading taken shortly before the braking event since, braking can make weight readings inaccurate under some circumstances.

Throughout the braking event, the brake monitoring system 25 monitors, amongst other things, the current delivery pressure, current demand pressure, the current measurement time stamp, current high-resolution timer value and current vehicle speed, and determines from those inputs when certain braking event conditions have been met.

The brake monitoring system 25 determines at 108 if the current demand pressure ($dem_C$) is greater than the high-watermark demand pressure ($dem_H$). If it is, the current demand pressure is recorded 110 as the new high-watermark demand pressure. If not, the existing high-watermark demand pressure remains as it is.

The brake monitoring system 25 determines at 112 if any of the following conditions occurs:

1. The last demand pressure ($dem_L$) is not equal to the current demand pressure ($dem_C$); or
2. The current demand pressure ($dem_C$) is smaller than the set minimum demand pressure ($DEM_C$); or
3. The current vehicle speed ($v_C$) is smaller than the set minimum vehicle speed ($V_C$).

If any of the conditions in 112 occur, the brake monitoring system 25 determines and records 114 the following:

1. The total demand pressure ($dem_T$), which is calculated from the previous total demand pressure ($dem_T$)+an increment in demand pressure occurring since the last measurement time stamp (($t_{NOW}$-$t_L$)×$dem_L$); and
2. Setting the last time stamp measurement value ($t_L$) to equal the current high-resolution timer value ($t_{NOW}$); and
3. Setting the last demand pressure value ($dem_L$) to equal the current demand pressure value ($dem_C$)

If any of the conditions in 112 do not occur, or if they do occur and the values mentioned in step 114 have been determined and recorded, the brake monitoring system 25 determines 116 if any of the following conditions occur:

1. The current demand pressure ($dem_C$) is smaller than the set minimum demand pressure ($DEM_C$); or
2. The current demand pressure ($dem_C$) is smaller than the difference between the high-water mark demand pressure and a set minimum demand pressure drop ($dem_H$-$DEM_{DROP}$); or 3. The current vehicle speed ($v_C$) is less than the set minimum vehicle speed ($V_C$)

If any of the conditions in 116 do not occur, the brake monitoring system 25 loops back round to decision 108, and continues the process from that decision.

If any of the conditions in 116 occur, the brake monitoring system 25 determines that the braking event has ended 118.

For conditions 1 and 2, the current demand pressure falling below a certain predetermined value indicates that the driver is easing off the brake pedal, and therefore further data is likely to be less useful.

For condition 3, this indicates that the current vehicle speed has dropped to a value where further useful braking event data is unlikely to be obtained.

If the brake monitoring system 25 determines that the braking event has ended 118, it determines and records the following:

1. The duration of the braking event=the current high-resolution timer value−the timestamp measurement at the start of the braking event ($B_{DUR}=t_{NOW}-t_S$); and 2. The average deceleration for the braking event=the change in vehicle speed for the braking event [vehicle current speed−vehicle speed at the start of the braking event]/the duration of the braking event ($B_{DEC}=(v_C-v_S)/(t_{NOW}-t_S)$); and 3. The average demand pressure for the braking event=the total demand pressure/the duration of the braking event ($B_{DEM}=dem_T/(t_{NOW}-t_S)$).

While the process is illustrated as calculating vehicle deceleration by means of change in vehicle speed over braking event duration, vehicle deceleration values for a braking event may be obtained from a sensor, such as an accelerometer 42.

The brake monitoring system 25 applies at least one further filter 120, and preferably a plurality of filters, to determine whether or not the braking event data should be permanently saved 122 for data analysis purposes, or whether the braking event data should be discarded 124. Preferably the further filters determines if:

1. The duration of the braking event ($B_{DUR}$) is greater than or equal to a set minimum braking event duration ($DUR_C$); and 2. The average demand pressure for the braking event ($B_{DEM}$) is greater than a set minimum demand pressure ($DEM_C$)

If at least one, and preferably both, conditions are met, the braking event data is saved 122 in the non-volatile memory 29 for data processing purposes. Otherwise, the braking event data is discarded 124.

The further filter 120 ensures that braking events having a short duration are not analysed since they can distort the results of the data processing stage. The further filter 120 ensures that braking events having a low demand are not analysed since they can distort the results of the data processing stage.

The data is preferably recorded as data series. This is illustrated in tabular form below (see Table 1).

TABLE 1

| Braking event | Date | Time | $B_{DUR}$ and/or $t_{NOW}$ and $t_S$ | $B_{DEM}$ and/or $v_C$, $v_S$, $t_{NOW}$ and $t_S$ | $B_{DEC}$ and/or $dem_T$, $t_{NOW}$ and $t_S$ |
|---|---|---|---|---|---|
| 1 | | | | | |
| 2 | | | | | |
| n | | | | | |

The braking event data stored may include additional data fields for data processing purposes, for example data fields such as: road angle; vehicle position; air spring pressure and/or data from any other useful sensor such as brake temperature or tyre pressure.

While the data collection process described above determines and stores the braking event duration, average deceleration and average braking demand values for each braking event on the vehicle, it will be appreciated by the skilled person that the brake monitoring system 25 can be used to capture the raw data and/or intermediate data required to determine those values, and the calculated values can be determined by the data processing system 40.

Data Transfer

The brake monitoring system 25 is arranged to communicate the braking event data to the data processing system 40, for example via the telecommunications device 39 and/or via the data port 41.

The data is received and stored by the data aggregation and storage module 42.

Data Processing

The data aggregation and a data storage module 42 may correct the vehicle deceleration values for at least some braking events by applying an environmental conditions correction if sufficient environmental conditions data is available.

The data correlation and trend analysis module 48 may correct the vehicle deceleration values for at least some braking events by applying a road angle correction if road angle data is available.

The data correlation and trend analysis module 48 may correct the vehicle deceleration values for at least some braking events by applying a tractor unit correction if tractor unit data is available.

Figure 4:
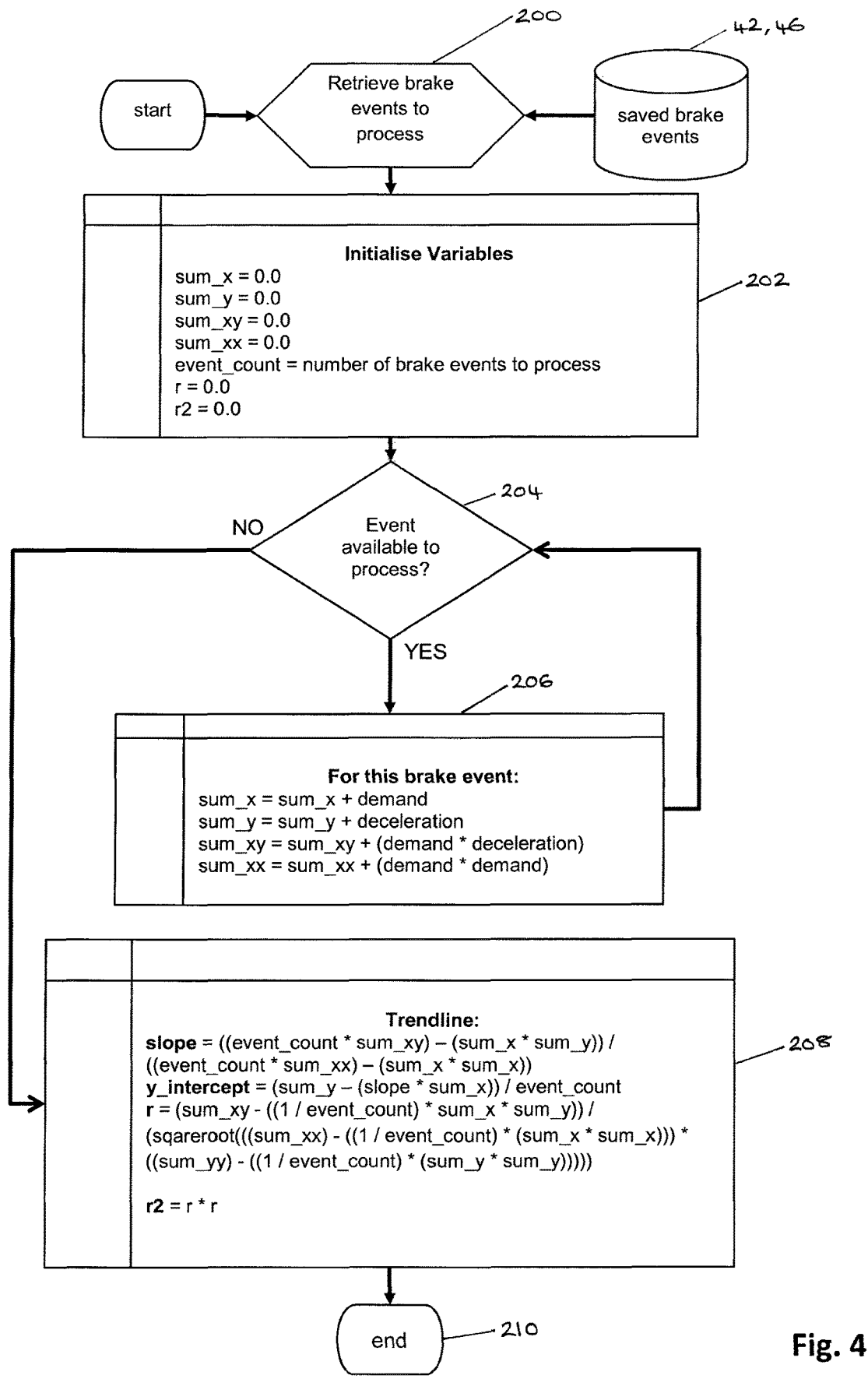
FIG. 4 is a flow diagram illustrating a method for analysing data obtained by the method shown in FIG. 3 to generate a trend based on that data.

A preferred data processing method is shown in FIG. 4. The method defines a data set of braking events, applies a statistical method to the data set to generate a trend line, typically a straight line, and compares the trend line and/or data defining the trend line with a reference line and/or data defining the reference line. The trend line is generated on the basis of the average braking demand and average vehicle deceleration values for each braking event in the data set. The vehicle deceleration values used are either the originally determined vehicle deceleration values, or the vehicle deceleration values that have been corrected by at least one of the corrections mentioned above.

The trend analysis module 48 retrieves 200 a data set of braking events from a database 42,46. The data set comprises a predetermined number of braking events, for example a predetermined number of the most recent braking events, such as the last 30 braking events. Thus the chorological order in which the braking events occurred is important and should be recorded in, or be derivable from, the data collected from the vehicle.

The trend analysis module 48 applies a linear regression method to the average braking demand and average vehicle deceleration values. This includes setting initial values for the following variables 202:

sum_x=0.0
sum_y=0.0
sum_xy=0.0
sum_xx=0.0
event_count=number of braking events to process
r=0.0
$r^2$=0.0

The 'x' value represents braking demand and the 'y' value vehicle deceleration.

The trend analysis module 48 determines 204 if an event is available to process. For each of the braking events in the data set the trend analysis module 48 performs the following operations 208, and records the data:

$$\text{sum\_}x=\text{sum\_}x+\text{demand}$$

$$\text{sum\_}y=\text{sum\_}y+\text{deceleration}$$

$$\text{sum\_}xy=\text{sum\_}xy+(\text{demand}*\text{deceleration})$$

$$\text{sum\_}xx=\text{sum\_}xx+(\text{demand}*\text{demand})$$

Thus the new sum_x=the current sum_x+demand value for the braking event being evaluated. The new sum_y=the current sum_y+deceleration value for the braking event being evaluated. The new sum_xy=the current sum_xy+(demand*deceleration) for the braking event. The new sum_xx=current sum_xx+(demand*demand) for the braking event.

The model loops through all the braking events in the data set until the sum values are calculated.

When completed the trend analysis module 48 generates 208 a trend line according to the straight line formula y=mx+c and records the data which defines the trend line in the analysed data store 50:

$$\text{slope}=((\text{event\_count}*\text{sum\_}xy)-(\text{sum\_}x*\text{sum\_}y))/\\((\text{event\_count}*\text{sum\_}xx)-(\text{sum\_}x*\text{sum\_}x))$$

$$y\_\text{intercept}=(\text{sum\_}y-(\text{slope}*\text{sum\_}x))/\text{event\_count}$$

$$r=(\text{sum\_}xy-((1/\text{event\_count})*\text{sum\_}x*\text{sum\_}y))/(\text{sqareroot}(((\text{sum\_}xx)-((1/\text{event\_count})*\\(\text{sum\_}x*\text{sum\_}x)))*((\text{sum\_}yy)-((1/\text{event\_count})*\\(\text{sum\_}y*\text{sum\_}y)))))$$

$$r2=r*r$$

The objective of the linear regression is to determine the equation of a straight line which is a "best fit" for the data set. One preferred regression type is where the "best fit" trend line is defined as the line that minimises the sum of squared residuals of the linear regression model without specifying an intercept term.

The method also generates an "$r^2$" value which is a statistical measure of how well the data fits the model described by the regression.

Figure 5:
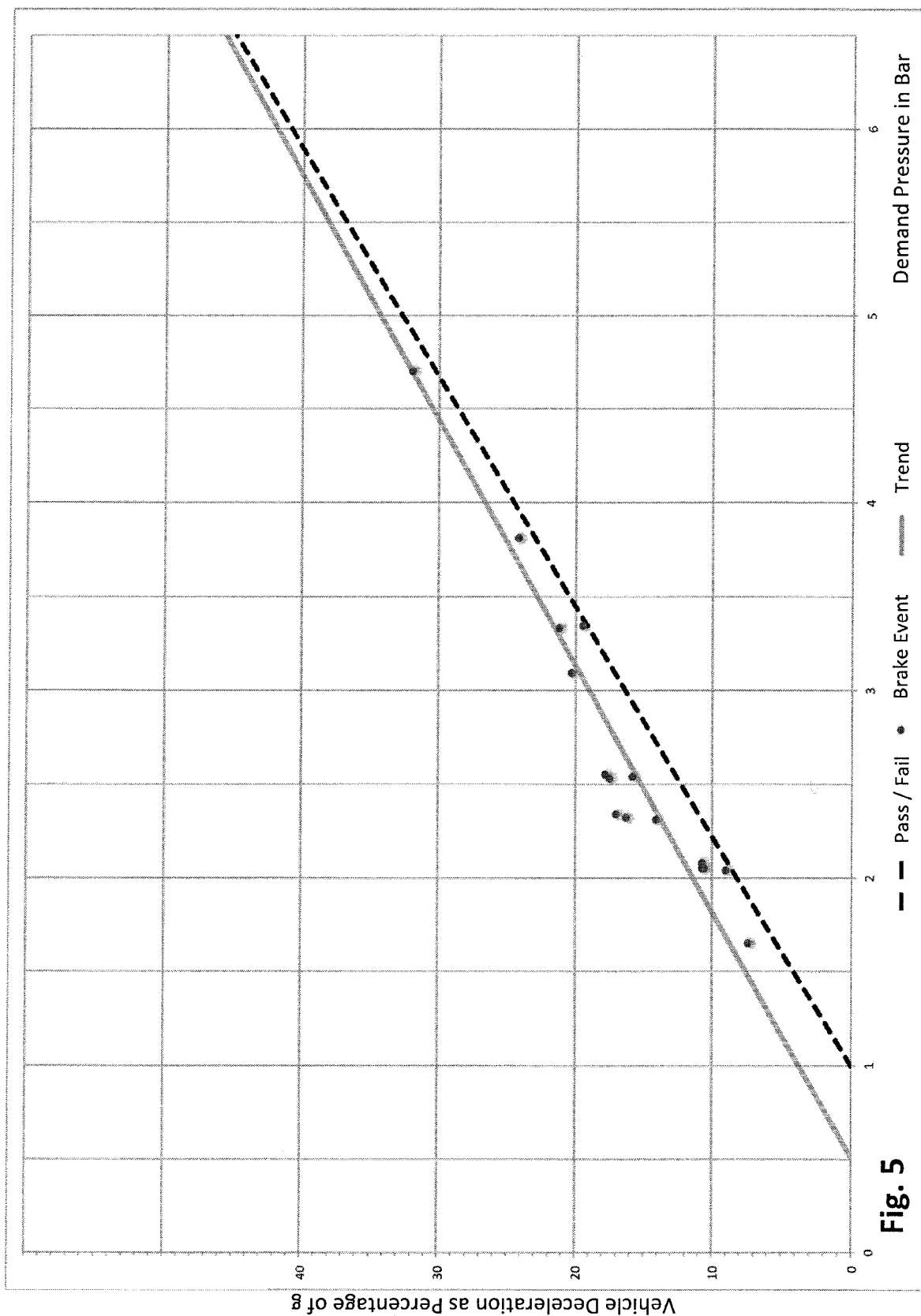
FIG. 5 is a graph of deceleration (y-axis) versus braking demand pressure (x-axis) for a data set obtained by the method shown in FIG. 3, which includes a trend line generated by the method shown in FIG. 4 and a pass/fail reference line for comparison with the trend line.

The trend analysis module 48 compares the generated trend line and/or data defining the generated trend line with the reference line and/or data defining the reference line. The reference line is a straight line, and is selected according to the vehicle type under consideration. For example, the reference line shown in FIG. 5 is for a semi-trailer and has a vehicle deceleration, defined as a % of g, of 0 (zero) at a demand pressure of 1 bar. The reference line has a vehicle deceleration of 45% of g at a demand pressure of 6.5 bar.

The reference line can be defined as:

$$\text{pass rate vehicle deceleration}=((45/5.5)*\text{demand pressure})-8.18$$

or more succinctly:

$$\text{pass rate vehicle deceleration}=8.18*(\text{demand pressure}-1)$$

A reference line for towing vehicles, full trailers or centre axle trailers would have a vehicle deceleration (defined as a % of g) of 0 (zero) at a demand pressure of 1 bar and a vehicle deceleration of 50% of g at a demand pressure of 6.5 bar. Typically the vehicle deceleration value for the reference line at 6.5 bar is in the range 40% of g to 60% of g, and preferably in the range of 45% of g to 55% of g.

The trend analysis module 48 determines if the braking system 7 has passed or failed the test by comparing the trend line and/or data defining the trend line with the reference line and/or data defining the reference line. The pass zone is defined by values on or above the reference line.

It is preferred that the trend analysis module 48 compares the trend line deceleration value for a braking demand of 6.5 bar with the reference line deceleration value for a braking demand of 6.5 bar. It is preferred that the trend analysis module 48 determines a pass/fail result on the basis of this comparison.

Under normal driving conditions, fewer braking events take place at high demand pressures, however it is braking events at higher braking demand pressures that are more indicative of the operating status of the braking system 7 than those at lower braking demands. By applying a trend analysis to the data set of braking events, the data processing method is able to predict the effectiveness of the braking system 7 based on braking events taking place at lower braking demand pressures, which are common under normal driving conditions.

The data processing system 40 can use the trend values and reference line values to estimate when the braking system 7 is likely to fall below the reference line, and thus fail the test. The operator can use this information to schedule preventative maintenance to ensure that the braking system 7 operates within legal requirements, while minimising the time that the vehicle is unavailable.

Displaying Results

The data processing system 40 displays the test results graphically by plotting the data points, trend line and reference line on a graph of vehicle deceleration as a percentage of g on the y-axis against braking demand pressure in bar on the x-axis. For example, see FIG. 5.

The data processing system 40 provides the user with additional information such as the $r^2$ value; braking event data used to generate the graph; the trend vehicle deceleration value for a braking demand pressure of 6.5 bar.

The graphical user interface can be arranged to enable the user to adjust the number of data points in data set, and thereby change the time period over which comparisons are made.

The graphical user interface can be arranged to enable the user to apply at least one filter to the data set. For example, the graphical user interface can be arranged to enable the user to filter braking events for the data set on the basis of at least one of the following: braking demand, vehicle load at the time of the braking event, road angle, environmental conditions, tractor unit, braking event duration and vehicle speed.

The data processing system 40 enables the user to analyse and view different data sets for a particular vehicle, and data sets relating to different vehicles. Thus the invention provides a fleet operator with an excellent tool for managing the braking performance of the vehicles and ensuring that they meet regulatory requirements.

It will be apparent to the skilled person that modifications can be made to the above embodiment that fall within the scope of the invention, for example:

While it is desirable to use a plurality of data filters, embodiments of the invention can be provided that include only one data filter. Each data filter can be used individually. The data filters can be used in any suitable combination.

Road Angle Correction/Filter

The road angle data can be used for data processing purposes to either correct the determined vehicle deceleration for at least some braking events, or to filter out at least some braking events.

The road angle can affect the vehicle deceleration measured during a braking event. When the road is inclined downwards, the braking system has to work harder to overcome the effect of gravity on the vehicle. When the road is inclined up awards, gravity assists the braking effect.

For braking events where the vehicle deceleration is corrected, the road angle correction uses the road angle value, which can be positive or negative depending on whether the road is inclined upwards or downwards. Standard trigonometry is used to adjust the vehicle deceleration value recorded by brake monitoring system 25, and/or the vehicle deceleration value as corrected by another correction. It is preferred to use trigonometry to determine the horizontal vector of the original vehicle deceleration value. For example, using the following formula:

Corrected (horizontal) deceleration=determined deceleration*cosine(road angle).

The braking event may be filtered out, for example, if the road inclination is above or below a threshold value, it being deemed that the effect of gravity on the determined vehicle deceleration may distort the braking event data, making it unhelpful for determining whether or not the braking system is operating within acceptable limits.

Environmental Correction/Filter

The vehicle or the brake monitoring system 25 can include a positioning system 38, which is typically a GPS positioning system. The microprocessor 27 is arranged to receive data from the positioning system 38 for a braking event, and to record position data in the in the memory 29. Preferably the clock 31 is set with reference to the accurate timestamp delivered by a GPS receiver. GPS signals can be used as a means of determining vehicle deceleration for a braking event.

Before regression analysis takes place, at least some of the braking events data may be modified to correct for environmental conditions. For example, environmental conditions data may be available for at least some braking events. Environmental conditions data may include road angle (if there is no gyroscope and/or accelerometer and/or altimeter), weather conditions along with any other relevant information which may be available such as the surface condition of the road.

Typically the average vehicle deceleration data can be adjusted to take account of environmental conditions. For example, the average deceleration can be adjusted if the weather was particularly cold or wet, the average deceleration of the vehicle may be lower than in warmer dry conditions. Similarly, different road surfaces, etc., can affect the performance of the braking system for a braking event. For example, the environmental data can be used to generate a correction factor, or a value that is added to, or subtracted from, the original deceleration value. The purpose of the correction is to remove or reduce the impact of the different environmental conditions on the average deceleration initially determined for a braking event.

The position data, and where necessary time data, can be used to interrogate environmental condition databases to obtain relevant information about the environmental conditions for the braking event.

Preferably, the environmental conditions correction takes place off vehicle, for example at the remote data processing system 40 or on a portable computer since it is likely to be easier and cheaper to access the environmental data in that manner, however the brake monitoring system 25 can be arranged to undertake this step on-board the vehicle. Additional environmental data being obtained, for example via the telecommunications device 39.

At least some braking events may be filtered out, for example, if the environmental conditions data is above or below a threshold value, it being deemed that the effect of the environmental condition on the determined vehicle deceleration may distort the braking event data, making it unhelpful for determining whether or not the braking system is operating within acceptable limits.

Tractor Unit Correction/Filter

A correction can be made to at least some of the braking event data to account for use of different tractor units 3 pulling a trailer. For example, the correction can be applied to at least some of the average deceleration values to account for use of different tractor units 3. It will be appreciated that the original average deceleration value is a measure of the deceleration of the whole vehicle 1. For vehicles 1 comprising a tractor unit 3 and a trailer 5, it is not uncommon for a given trailer 5 to be pulled by several different tractor units 3 over a relatively short period of time, for example 1 month. It is recognised that different tractor units 3 have different braking characteristics which can affect the overall deceleration of the vehicle 1. For example, the vehicle 1 may experience over-braking when a first tractor unit 3 is used, and may experience under-braking when a second tractor unit 3 is used. The purpose of the tractor unit correction is to remove or reduce the impact of the different tractor units 3 on the average deceleration of the whole vehicle 1. The tractor unit 3 correction takes this into account. The tractor unit correction can be used to generate a correction factor, or a value that is added to, or subtracted from, the original deceleration value, or the deceleration value as corrected for environmental conditions.

If a tractor unit correction is applied to the average deceleration, the tractor unit corrected average deceleration values are recorded in memory, for example in the data series.

Preferably, the tractor unit correction takes place off vehicle, for example at the remote data processing system 40, however the brake monitoring system 25 can be arranged to undertake this correction on-board the vehicle, tractor unit correction data being obtained, for example via the telecommunications device 39.

A preferred method for calculating the tractor unit correction is described below with reference to FIGS. 6 and 7.

Since each trailer 5 and tractor unit 3 is uniquely identified, over time the operator is able to manage the maintenance requirements for an entire fleet of vehicles in this manner, including determining maintenance schedules for the tractor units 3 separately from the trailers 5. Also, over time, a large bank of data will be available for analysis, which will enable the operator to identify trends for vehicle types, issues of compatibility between trailers and tractor units, the individual performance of each tractor unit and each trailer.

Figure 6:
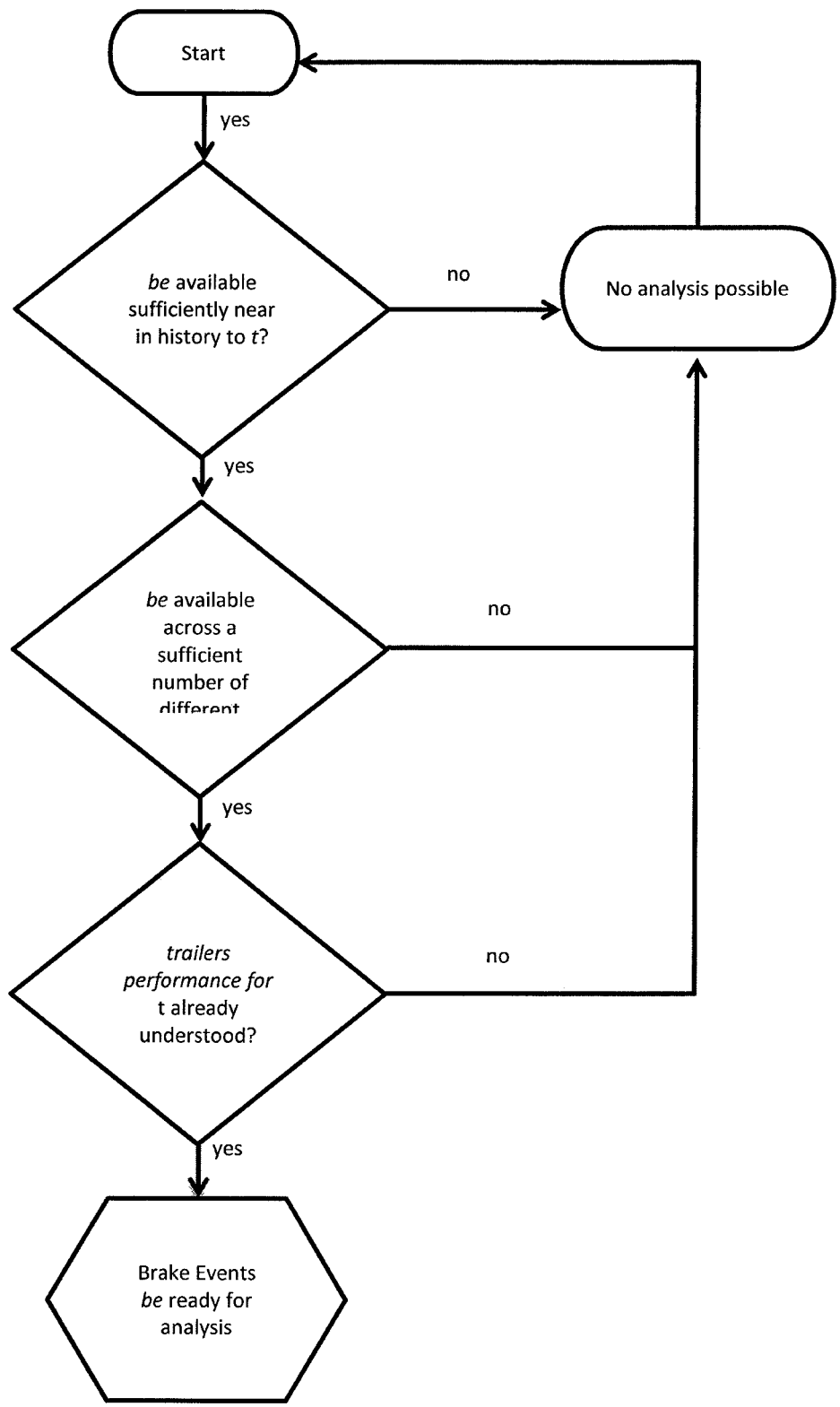
FIG. 6 is a flow chart showing a qualifying data process for determining useable data for a tractor unit correction process outlined in FIG. 7.
Figure 7:
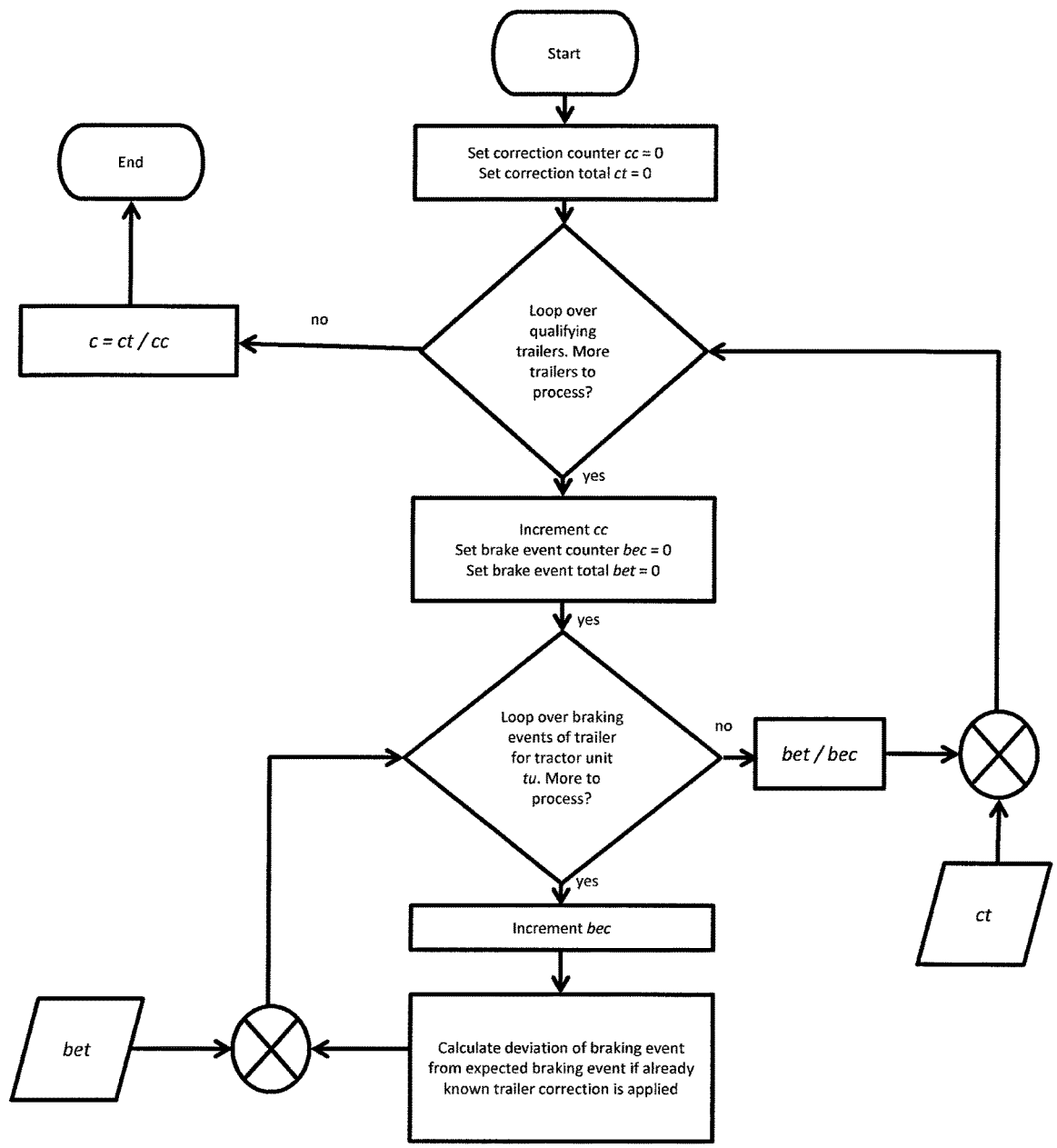
FIG. 7 is a flow diagram showing a process for determining the tractor unit correction value.

FIGS. 6 and 7 are flow diagrams which provide an example of how the tractor unit correction can be determined. The process attempts to correct the average deceleration data for the vehicle based on trends that are attributable to the tractor units only. In FIGS. 6 and 7, the processes create a correction value c for a tractor unit u, which may be applied to braking events where a trailer is pulled by tractor unit u for a time period t.

FIG. 6 illustrates a possible process for determining qualifying data which can be used for determining the tractor unit correction. This includes considering whether the data points are: sufficiently close in time to one another and no maintenance events on either the tractor unit or the trailer has occurred within the relevant time period, which could affect the data; if data across several different trailers is available for that tractor unit, that is, the tractor unit has pulled a plurality of different trailers and data is available for each of the tractor unit-trailer combinations; and if each trailer's performance is already understood. In some systems, it may be necessary to seed correction values, initially at least, in order to obtain the tractor unit correction.

Once a sufficient data set is available the process outlined in FIG. 7 is applied.

This process initially calculates an average performance value for the tractor unit in respect of each trailer in the data set, that is, one value per trailer-tractor unit combination. For example, five trailers would generate five values. This is achieved by analysing a data set of braking events for each trailer when coupled to the tractor unit, and for each trailer-tractor unit combination calculating the deviation of the expected braking event if an already known trailer correction is applied.

The process then calculates an average value for the tractor unit, by averaging all of the values calculated for the different trailer-tractor unit combinations.

This provides a tractor unit correction which can be applied to the average deceleration values.

Rate of Turn Correction/Filter

Further corrections can be applied to the determined vehicle deceleration values, such as a rate of turn correction. Data can be obtained from at least one of the positioning system 38, wheel speed sensors, accelerometer 42 and gyroscope 43 in order to determine the rate of turn for a braking event. If the vehicle is turning for a braking event, the rate at which it turns has an impact on the average deceleration since turning affects the direction of travel of the vehicle. This data can be used to calculate a correction that can be applied to the vehicle deceleration values.

At least some braking events may be filtered out, for example, if the rate of turning data is above or below a threshold value, it being deemed that the effect of the vehicle turning on the determined vehicle deceleration may distort the braking event data, making it unhelpful for determining whether or not the braking system is operating within acceptable limits.

Vehicle Loading Categorization/Filter

When a commercial vehicle is operated on the road the load supported by the axles is dependent upon the load being carried by the vehicle. Vehicles can be operated within the load range from fully unloaded to fully loaded (sometimes referred to as fully unladen to fully laden). An objective when assessing brake performance is to predict that the available brake performance is sufficient such that a fully laden vehicle fulfils the prescribed "in service" braking performance. Accordingly, in some circumstances, braking events taking place when the vehicle has a higher load may be most valuable for predicting braking performance. Consequently, it is desirable to record the vehicle load, for example as determined by the air spring 21 pressure, for each braking event. This data can be used in a weighted trend analysis technique, see below.

The vehicle load data also enables braking events to be categorised into vehicle load categories. For example, for a vehicle having an 8 tonne per axle capacity, braking events can be categorised as follows:

Load range 1: unloaded to 4 tonne axle load (0% loaded to 50% loaded)

Load range 2: 4 tonne to 6 tonne axle load (50% loaded to 75% loaded)

Load range 3: 6 tonne to 8 tonne (75% loaded to 100% loaded)

The number of categories, and the category boundaries, are at least in part determined by the type of vehicle, the loads carried, and possibly the maximum permitted axle loads for the vehicle in a given country.

Thus a user is able to filter the braking event data to define a data set of braking events for data processing purposes, which only includes braking events from at least one load category of interest.

Endurance Brake Correction/Filter

Some vehicles, such as HGVs, include additional braking systems which are typically referred to as endurance brakes, which provide additional retardation to the main braking system 7, under some circumstances. Examples of endurance brakes are: engine retarders; exhaust retarders; hydraulic drive line retarders; and electric driveline retarders.

Since the or each endurance brake is not used for every braking event, it is desirable to correct the determined vehicle deceleration to remove the component of deceleration which is attributable to the or each endurance brake. Accordingly the brake monitoring system 25 can be arranged to monitor the braking effect of the or each endurance brake and to correct the determined vehicle deceleration to remove the component of vehicle deceleration which is attributable to the or each endurance brake. Additionally, or alternatively the brake monitoring system can be arranged to filter out braking events where one or more endurance brakes provide braking assistance, or, for example when they provide braking assistance greater than or equal to a predetermined threshold value.

Alternative Trend Analysis Techniques

The data processing system 40 can be arranged to apply a different type of trend analysis from the least squares trend analysis described above. It has been found that different types of linear regression may yield more accurate regression models for particular types of data sources.

A preferred alternative is to use a weighted trend analysis technique, for example a weighted linear regression algorithm, such as a weighted least squares method. A weighted trend analysis technique gives greater weighting to some braking events than other braking events when generating the trend. Using a weighted technique can be useful since many of the braking events during normal driving take place under conditions which are quite different from "in service" testing requirements. A weighting technique may, for example give greater weighting to braking events which are considered to be more useful for predicting the performance of the braking system 7 than those that are considered to be less important. A weighting technique may, for example give greater weighting to braking events which are closer to the "in service" testing requirements than those that are farther removed from those requirements.

The inventors have found that weighting braking demand data can be useful for improving the reliability of braking performance monitoring. Giving greater weighting to events having higher braking demand and less weighting to events having lower braking demand is particularly effective.

Additionally, or alternatively, the weighted trend analysis technique can weight braking events using at least one other variable when generating the trend.

The inventors have discovered that weighting braking events by load carried by the vehicle for the braking event is useful for improving the reliability of braking performance monitoring. Giving greater weighting to braking events taking place at heavier loads and less weighting to events taking place at lower loads is particularly effective. For example, an empty vehicle may be considered to be only as half reliable as a fully laden vehicle for brake monitoring purposes.

The inventors have discovered that weighting braking events according to the change in speed experienced by the vehicle for the braking event is useful for improving the reliability of braking performance monitoring. Giving greater weighting to braking events having larger speed changes and less weighting to events having lower speed changes is particularly effective. For example, the weighting can be proportional to the speed change.

Each of the weighting types mentioned above can be applied individually to a data set or any combination of the weighting types can be applied. The inventors have found that it is useful to use at least two of the weighting types mentioned above. A preferred way of combining a plurality of weightings for braking events is to use the geometric mean of the plurality of weightings:

$$(w1*w2* \ldots *wn)^{(1/n)}$$

Where:
w1 is a first weighting for the braking event;
w2 is a second weighting for the braking event; and
wn is the nth weighting for a braking event.

A trend analysis technique can be used to predict the value of a variable (vehicle deceleration) based on the value of one or more other variables. This can be used, for example to take into account road angle for a braking event. One useful technique to achieve this is multiple regression. For example, multiple regression can be used to generate predicted deceleration values for an average or baseline value of the additional variables, for example at zero incline. This technique can be useful for addressing variability in the data sets.

The precision of trend analysis prediction depends on the number of data points (braking events) in the set and their weighting. The data processing system 40 can be arranged to provide the user with a value indicating the confidence interval for the prediction, that is, a measure of reliability of the results presented by the trend. For example, this can be expressed in a 95% confidence interval for the prediction. This can be interpreted as a margin of error.

The user may only make a decision on whether the brakes pass or fail if the prediction is within a certain margin of error. The confidence values selected for determining if the data is sufficiently robust to make a pass/fail decision are selected for the application. For example, a margin of error of +/−5% may suggest that there is insufficient reliable data to determine if the braking system 7 is operating within the "in service" requirements, whereas a margin of error of +/−2% may indicate that there is sufficient evidence to make a pass/fail decision.

While it is preferred to use a trend analysis technique that generates a straight line, it is envisaged by the inventors that a technique which generates a curve of best fit may be used for some data sets.

A curve of best fit may also be generated as an intermediate step for generating a line of best fit for a plurality of journey data sets. A line of best fit may be generated for each journey data set. Each journey line of best fit may be combined in a manner that generates a curve of best fit, for example lining up the lines of best fit for each journey end to end. A line of best fit for the larger data set may then be generated from each journey trend.

Other Modifications

It is also envisaged by the inventors that other signals may be present in the data, which may be indicative of braking system 7 problems, such as a wheel not braking properly. This may lead to, for example, a detectable trend in a data series. Capturing additional data for a braking event may assist with this process, for example capturing data from the sensor 43 and/or other sensor data such as wheel speed, brake temperature, suspension pressure, tyre pressure, delivery pressure, etc.

Instead of applying data filters on the vehicle, it is possible to record all available braking event data on the vehicle and apply filters to the entire data set at the remote data processing system 40.

The apparatus can be integrated into the braking system 7, for example as part of the EBS.

While a cellular network type telecommunications device 39 is specified in the embodiment, any other suitable wireless communications devices can be used for transmitting data to the data processing system 40, including relaying via another device such as a mobile phone, or even downloading the data to a laptop and then uploading the data via a web portal.

Positioning systems other than GNSS can be used.

A clock other than a real-time clock can be used to provide values for time. The real-time can be calculated later from the received values for time, a reference time such as the time the clock was started or reset, and if required, a conversion factor. The real-time can be calculated, for example by the micro-controller 17 or an external processor such as a computer at the remote control centre.

At least one of the microprocessor 27, memory 29, clock 31 and data tag reader can be located on the tractor unit 3, and the data tag can be located on the trailer 5.

The vehicle can be an integrated vehicle, and not an articulated vehicle. In this instance, only a single unique identifying code is required, and no correction is required for the tractor unit.

Either the vehicle data code, tractor unit data code or trailer data code can be imported into the data from an external computer system such as Fleet Management System.

The invention is also applicable to vehicles that do not include an EBS, but rather a conventional braking system, however in this instance it may be necessary to fit additional sensors to the vehicle in order to obtain the braking event data.

The vehicle can include a display device. Data captured by the brake monitoring system 25 can be displayed on the display device.

Some or all of the data processing steps can be carried out on-board the vehicle 1.

The results of the data processing steps can be displayed on the display device. This enables the driver to access the results.

The brake monitoring system 25 may omit memory 29 and can be arranged to send collected data on the fly to the remote processing unit 40. Data is stored at the remote processing unit.

The brake monitoring system 25 may include an altimeter (not shown) as a means of determining changes in road gradient using other data such as distance travelled during the brake event.

Comparison of Individual Wheel Brake Performance

A limitation of determining overall vehicle braking performance is that it is not possible to define when an individual brake has low performance or to determine differential braking performance across an axle. Although measurement of individual wheel brake performance may be possible it could require specialised equipment and be very expensive which is impractical for vehicles in service. However, there are possibilities to determine when a given brake is under or over performing compared to other wheels on an axle or bogie.

Temperature Measurement

The principle of a friction brake is to turn kinetic energy into heat therefore the work done by a specific brake is directly related to the heat generated and the temperature of the brake.

Therefore by measurement of the brake temperature for each wheel brake would provide an indication if a brake was under performing relative to another brake. Optionally, the brake monitoring system 25 can include brake temperature sensors 19. One problem with this approach could be the reliability of sensors, also it would be necessary to maintain each wheel end such that they have the same component make/model and that they are equally worn otherwise temperature differences could be due to different materials or volumes or material.

Comparison of Wheel Slip

When a wheel is braked its rotational speed is less than the road speed of the vehicle and it is this slip which generates the degree of retarding force. Some vehicles are equipped with wheel speed sensors as an integral part of the braking system 7 on each wheel of the vehicle. In such cases by comparing the instantaneous speed of the sensed wheels relative to vehicle speed it is possible to define when a brake is under performing as the wheel slip generated by the brake will be less than that measured at other wheels.

Indications from Accelerometer and/or Gyroscope

Data from the accelerometer 42 and/or gyroscope 43 can be used to determine the acceleration of the vehicle in the direction of travel; and/or the lateral vehicle acceleration. The lateral acceleration indicates if the vehicle is pulling to one side for a braking event, which can be indicative of the brakes not being well balanced on the left and right sides of the vehicle, and/or that at least one of the brakes is not operating correctly.

The invention claimed is:

1. A method for monitoring the braking performance of a vehicle, including, for at least some of braking events: determining a braking demand; determining vehicle deceleration; defining a data set of braking events, wherein each braking event in the data set includes a determined braking demand and a determined vehicle deceleration; applying a statistical trend analysis method to the data set to generate a vehicle deceleration and braking demand straight line trend; providing a vehicle deceleration and braking demand reference; comparing at least one trend value with at least one reference value; and estimating a vehicle deceleration value for at least one braking demand value which is larger than the largest braking demand value in the data set.

2. A method according to claim 1, including estimating vehicle deceleration values for braking demands greater than or equal to 4 bar.

3. A method according to claim 1, including comparing at least one straight line trend vehicle deceleration value with at least one reference vehicle deceleration value for a predetermined braking demand value, and determining if a braking system is operating satisfactorily, at least in part, on the basis of that comparison.

4. A method according to claim 1, including applying a weighted statistical trend analysis method to the data set.

5. A method according to claim 4, wherein the weighted statistical trend analysis method is a weighted least squares linear regression.

6. A method according to claim 4, wherein the statistical trend analysis method uses the following data type to weight braking events: vehicle load.

7. A method according to claim 1, including providing a confidence rating that is indicative of the reliability of the data set to provide reliable estimated values.

8. A method according to claim 1, wherein the reference comprises a straight line.

9. A method according to claim 8, wherein the reference has a non-zero braking demand value at zero deceleration.

10. A method according to claim 9, wherein the reference has a braking demand value of approximately 1 bar for zero deceleration; and the reference has a deceleration value of greater than or equal to 0.4 g for a braking demand pressure of 6.5 bar and the reference has a deceleration value of less than or equal to 0.55 g for a braking demand pressure of 6.5 bar.

11. A method according to claim 1, including plotting a graph in a graphical user interface of vehicle deceleration vs braking demand, using the braking events data set.

12. A method according to claim 1, including defining a new data set of braking events, wherein each braking event in the data set includes a determined braking demand and a determined vehicle deceleration; and applying the statistical trend analysis technique to the new data set to generate a new vehicle deceleration and braking demand straight line trend; and, including comparing the new vehicle deceleration and braking demand straight line trend with a previously generated vehicle deceleration and braking demand straight line trend.

13. A method according to claim 12, including comparing at least one value from the new vehicle deceleration and braking demand straight line trend with at least one value from the vehicle deceleration and braking demand reference to determine if the braking system is operating satisfactorily.

14. A method according to claim 12, including comparing a plurality of vehicle deceleration and braking demand straight line trends for a vehicle, determining the rate of change in trend vehicle deceleration for a predetermined value of braking demand value, and scheduling a vehicle maintenance event, at least in part, on the basis of that comparison.

15. A method according to claim 1, including estimating the time at which the straight line trend vehicle deceleration will equal a reference deceleration for a specified braking demand.

16. A method according to claim 1, including differentiating between qualifying braking events and non-qualifying braking events.

17. A method according to claim 16, including determining a braking event is a non-qualifying event, at least in part, in response to determining that a delivery pressure is less than or equal to a threshold value.

18. A method according to claim 16, including determining a braking event is a non-qualifying event, at least in part, in response to determining that a delivery pressure is exerted for a period of time which is less than or equal to a threshold value.

19. A method according to claim 16, including determining a braking event is non-qualifying, at least in part, in response to determining that the vehicle speed is less than or equal to a threshold value.

20. A method according to claim 16, including determining a braking event is non-qualifying, at least in part, in response to determining that the braking demand is less than or equal to a threshold value.

21. A method according to claim 16, including determining a braking event is non-qualifying, at least in part, in response to determining that a duration of the braking event is less than or equal to a threshold value.

22. A method according to claim 16, including determining a braking event is non-qualifying, at least in part, in response to determining that an output from an endurance brake device is greater than or equal to a threshold value.

23. A method according to claim 16, wherein a brake monitoring system, in response to a driver actuating the vehicle braking system, applying at least one braking event qualifying test to data received from the braking system; and wherein the brake monitoring system setting initial values for at least some variables in response to the brake monitoring system determining that the data received from the braking system has passed the or each braking event qualifying test.

24. A method according to claim 16, wherein a brake monitoring system applies at least one braking event qualifying test to at least some determined data and stores braking event data collected for the braking event only if the determined data passes the or each qualifying test.

25. A method according to claim 1, wherein a brake monitoring system determines a braking event duration, vehicle deceleration and braking demand, in response to at least one of the following conditions occurring: the current demand pressure is smaller than the set minimum demand pressure; the current demand pressure is smaller than the difference between the high-water mark demand pressure and a set minimum demand pressure drop; and the current vehicle speed is less than the set minimum vehicle speed.

26. A method according to claim 1, including determining vehicle load from data received from a sensor located on the vehicle and categorising the braking events into a plurality of load categories according to the determined vehicle load.

27. A method according to claim 26, wherein the data set of braking events includes braking events from one vehicle load category only.

28. A method according to claim 1, including, for at least some of the braking events, determining a road gradient.

29. A method according to claim 1, including, for at least some of the braking events, determining the position of the vehicle.

30. A method according to claim 29, including using at least one of the position data and time data to identify relevant environmental conditions data for an environmental conditions correction process.

31. A method according to claim 1, including determining at least one unique identifier for the vehicle.

32. A method according to claim 1, wherein the vehicle includes a tractor unit and at least one trailer and determining a tractor unit identifier that uniquely identifies the tractor unit; and/or determining a trailer identifier that uniquely identifies the trailer.

33. A method according to claim 1, including, for at least some of the braking events, correcting the determined deceleration.

34. A method according to claim 33, including correcting the determined deceleration by at least one of: an environmental conditions correction;
    a road gradient correction; a tractor unit correction; a rate of turn correction and an endurance brake device correction.

35. A data processing system arranged to carry out a method according to claim 1, said data processing system including at least one data processing device, at least one data storage means, and data correlation and trend analysis module arranged to determine trends from the braking event data.

36. A data processing system according to claim 35, wherein the data processing system includes at least one of: a data aggregation and storage module; a data connection; a consolidated data store; analysed data store; data server module; report module; and user interface, which includes a graphical user interface, to gain access to the reports generated by the report module; and each module is provided as part of a vehicle fleet management system.

37. A method for monitoring the braking performance of a vehicle, including, for at least some of braking events: determining a braking delivery pressure; determining vehicle deceleration; defining a data set of braking events, wherein each braking event in the data set includes a determined braking delivery pressure and a determined vehicle deceleration; applying a statistical trend analysis method to the data set to generate a vehicle deceleration and braking delivery pressure straight line trend; providing a vehicle deceleration and braking delivery pressure reference; comparing at least one trend value with at least one reference value; and estimating a vehicle deceleration value for at least one braking delivery pressure value which is larger than the largest braking demand value in the data set.

* * * * *